US012753768B2

(12) United States Patent
Holenstein et al.

(10) Patent No.: US 12,753,768 B2
(45) Date of Patent: Oct. 6, 2026

(54) FAN

(71) Applicant: Levitronix GmbH, Zürich (CH)

(72) Inventors: Thomas Holenstein, Umiken (GB); Florian Wassmer, Aarau (CH)

(73) Assignee: Levitronix GmbH, Zürich (CH)

( * ) Notice: Subject to any disclaimer, the term of this patent is extended or adjusted under 35 U.S.C. 154(b) by 0 days.

(21) Appl. No.: 18/775,970

(22) Filed: Jul. 17, 2024

(65) Prior Publication Data

US 2024/0369065 A1 Nov. 7, 2024

Related U.S. Application Data

(63) Continuation of application No. 16/882,982, filed on May 26, 2020, now Pat. No. 12,078,181.

(30) Foreign Application Priority Data

Jun. 17, 2019 (EP) .................................... 19180504

(51) Int. Cl.
*F04D 25/06* (2006.01)
*F04D 19/00* (2006.01)
(Continued)

(52) U.S. Cl.
CPC ....... *F04D 25/0613* (2013.01); *F04D 19/002* (2013.01); *F04D 25/064* (2013.01);
(Continued)

(58) Field of Classification Search
CPC .. F04D 19/002; F04D 25/064; F04D 25/0646; F04D 25/08; F04D 27/001;
(Continued)

(56) References Cited

U.S. PATENT DOCUMENTS 6,194,798 B1 * 2/2001 Lopatinsky ........... F04D 25/066 310/63
6,420,810 B1 * 7/2002 Jeong .................. F16C 32/0431 310/90.5

(Continued)

FOREIGN PATENT DOCUMENTS

CN 1975174 A 6/2007
CN 101082343 A 12/2007

(Continued)

OTHER PUBLICATIONS

Extended European Search Report issued Dec. 13, 2019 in corresponding European Patent Application No. 19180504.3, filed Jun. 17, 2019.

(Continued)

*Primary Examiner* — Alexander B Comley
(74) *Attorney, Agent, or Firm* — Spencer Fane, LLP

(57) ABSTRACT

A fan having a rotor for generating a fluid flow includes a stator and a rotor, which form an electromagnetic rotary drive for rotating the rotor about an axial direction. The rotary drive is an external rotor, and the rotor includes a magnetically effective core configured in an annular manner. The impeller includes a hub on which a plurality of blades configured to generate the fluid flow is arranged, and the stator is a bearing and drive stator configured to magnetically drive the rotor without contact and magnetically levitate the rotor without contact with respect to the stator. The rotor is capable of being actively magnetically levitated in a radial plane perpendicular to the axial direction, the hub of the impeller completely enclosing the magnetically effective core of the rotor, and the stator is encapsulated in a stator housing and formed of a low-permeable material.

15 Claims, 15 Drawing Sheets

(51) Int. Cl.

| | |
|---|---|
| ***F04D 25/08*** | (2006.01) |
| ***F04D 29/058*** | (2006.01) |
| ***F04D 29/38*** | (2006.01) |
| ***H02K 7/14*** | (2006.01) |

(52) U.S. Cl.

CPC ......... *F04D 25/0646* (2013.01); *F04D 25/08* (2013.01); *F04D 29/058* (2013.01); *H02K 7/14* (2013.01); *F04D 29/384* (2013.01); *F05B 2240/51* (2013.01)

(58) Field of Classification Search

CPC .. F04D 29/058; F04D 29/384; F04D 2240/51; F04D 25/0613; H02K 7/14

USPC ............................. 417/423.7, 423.11, 423.12

See application file for complete search history.

(56) References Cited

U.S. PATENT DOCUMENTS

| | | | | | |
|---|---|---|---|---|---|
| 6,447,266 | B2 * | 9/2002 | Antaki | F04D 29/048 | 417/356 |
| 6,849,978 | B2 * | 2/2005 | Sun | F04D 29/058 | 310/90 |
| 6,896,492 | B2 * | 5/2005 | Masterton | F04D 25/066 | 310/254.1 |
| 7,417,345 | B2 * | 8/2008 | Chen | F04D 25/062 | 310/90.5 |
| 7,598,643 | B2 * | 10/2009 | Davis | F16C 32/0436 | 310/90.5 |
| 7,825,558 | B2 * | 11/2010 | Jungmayr | F04D 25/0653 | 310/90.5 |
| 7,832,922 | B2 * | 11/2010 | Schoeb | B01F 7/00925 | 366/273 |
| 8,398,378 | B2 * | 3/2013 | Simofi-Ilyes | H02K 7/14 | 417/356 |
| 8,581,462 | B2 * | 11/2013 | Nussbaumer | H02K 7/09 | 310/90.5 |
| 8,729,758 | B2 * | 5/2014 | Nussbaumer | F16C 32/0493 | 310/90.5 |
| 9,115,725 | B2 * | 8/2015 | Haefliger | F04D 29/0413 | |
| 9,366,261 | B2 * | 6/2016 | Yamada | F04D 29/048 | |
| 10,389,207 | B2 * | 8/2019 | Schoeb | H02K 7/09 | |
| 2006/0119198 | A1 * | 6/2006 | Chio | H02K 7/09 | 310/90.5 |
| 2007/0274821 | A1 | 11/2007 | Yoshida | | |
| 2008/0036321 | A1 * | 2/2008 | Yu | F04D 25/062 | 310/90.5 |
| 2009/0142827 | A1 | 6/2009 | Schoeb | | |
| 2015/0152883 | A1 | 6/2015 | Dybenko et al. | | |
| 2017/0007973 | A1 * | 1/2017 | Schob | F16C 32/0497 | |
| 2017/0012491 | A1 * | 1/2017 | Schob | H02K 3/18 | |
| 2019/0027984 | A1 | 1/2019 | Bott et al. | | |

FOREIGN PATENT DOCUMENTS

| | | | | |
|---|---|---|---|---|
| CN | 107313950 A | | 11/2017 | |
| CN | 108370206 A | | 8/2018 | |
| DE | 10246608 A1 | * | 4/2004 | F04D 25/0613 |
| EP | 2064450 B1 | | 9/2014 | |
| EP | 3045733 A1 | | 1/2016 | |
| EP | 3115616 A1 | * | 1/2017 | A61M 60/422 |
| FR | 2820176 A | | 8/2002 | |
| JP | S5211203 U | | 1/1977 | |
| JP | H0821396 A | | 1/1996 | |
| JP | 2002357197 A | | 12/2002 | |
| JP | 2003512004 A | | 3/2003 | |
| JP | 3129498 A | | 1/2007 | |
| JP | 2007154753 A | | 6/2007 | |
| JP | 2010071286 A | | 4/2010 | |
| JP | 3165612 U | | 1/2011 | |
| JP | 2013251721 A | | 12/2013 | |
| JP | 2018028318 A | | 2/2018 | |
| JP | 2019056309 A | | 4/2019 | |
| WO | 2019063395 A1 | | 4/2019 | |

OTHER PUBLICATIONS

Chinese Office Action issued Jan. 5, 2024 in corresponding Chinese Patent Application No. 2020-086811.

First Office Action issued Apr. 15, 2023 in corresponding Chinese Patent Application No. 202010493770.X.

Taiwanese Office Action issued Jan. 5, 2024 in corresponding Taiwanese Patent Application No. 109118616.

Taiwanese Search Report issued Jan. 5, 2024 in corresponding Taiwanese Patent Application No. 109118616.

* cited by examiner

FAN

CROSS-REFERENCE TO RELATED APPLICATION

This application is a continuation of U.S. application Ser. No. 16/882,982, filed May 26, 2020, which claims priority to European Patent Application No. 19180504.3, filed Jun. 17, 2019, the contents of which are hereby incorporated herein by reference in their entirety.

BACKGROUND

Field of the Invention

The disclosure relates to a fan having a rotor for generating a fluid flow.

Background Information

Fans are often used to cool various apparatuses or also for ventilating various buildings, systems or devices. It is usually the task of a fan to generate a fluid flow, and in particular an air flow, which then extracts heat from a specific location or also supplies heat, for example as a heat transfer medium. The fluid flow or air flow can also be used to remove unwanted gas accumulations or replace them with fresh air. Examples of the use of fans are the cooling of electronic circuits or power supplies, for example in computers. Fans can also be integrated into pipes or piping systems to generate a desired flow there or to maintain a pressure level. In particular in such applications, it is of course desirable that the fans have a compact design. Nevertheless, they should enable a high performance, which is why the fans are often operated at extremely high rotational speeds.

In many applications, fans are operated in a dusty or otherwise polluted environment. Dust or dirt deposits, in particular on the rotor bearings, can lead to very high wear and a short service life. In order to address also this problem in particular, fans are known in which the rotor is supported without contact, i.e. in particular without mechanical bearings. For example, in the case of these fans, the rotor is supported by magnetic or electromagnetic forces, for which normally at least one magnetic bearing is provided. In the case of magnetic bearings, a basic distinction is made between a passive and an active magnetic bearing. A passive magnetic bearing or stabilization cannot be controlled or regulated. It is usually based on reluctance forces. Passive magnetic bearings or stabilizations thus operate without external energy supply. An active magnetic bearing is a bearing that can be controlled. In the case of an active magnetic bearing, the position of the body to be supported can be actively influenced or regulated, for example by the impressing of electromagnetic fields. For example, a fan with a contactless magnetically supported rotor is known from the European patent specification EP-B-2 064 450. There, a fan is proposed which comprises at least one passive radial magnetic bearing and an active, i.e. regulatable axial magnetic bearing system.

On the other hand, fans, which have no mechanical bearings are particularly suitable for conveying high-purity gases because there is no danger of abrasion as can occur in mechanical bearings. Such high-purity gases are used, for example, in laser technology.

SUMMARY

Even if the magnetic bearing of the rotor in fans has proven its worth, there is still room for improvement, in particular with regard to the compact design of the fan as far as possible, while at the same time maintaining high performance, or with regard to wear and the service life of the fan. In particular in chemically aggressive environments, such as those found in the semiconductor industry, fans are exposed, for example in pipe systems, to aggressive substances, such as corrosive vapors or gases, particle-loaded air streams containing solid particles or fine droplets of liquids, such as photoresist, or sulfur hexafluoride ($SF_6$), which is used as an etching gas in semiconductor production. Such more aggressive environments often result in increased wear or an unsatisfactorily short service life of the fan. The present disclosure is dedicated to these problems.

It is therefore an object of embodiments of the disclosure to propose a very compact and at the same time efficient fan which can be operated without mechanical bearings for the rotor and which is also suitable for use in more aggressive environmental conditions.

The object of embodiments of the disclosure meeting this problem is characterized by the features described herein.

According to embodiments of the disclosure, a fan is thus proposed having a rotor for generating a fluid flow and having a stator which, together with the rotor, forms an electromagnetic rotary drive for rotating the rotor about an axial direction, the rotary drive being designed as an external rotor, the rotor comprising a magnetically effective core which is designed in an annular manner, and an impeller which comprises a hub on which a plurality of blades for generating the fluid flow is arranged, the stator being designed as a bearing and drive stator with which the rotor can be magnetically driven without contact and can be magnetically levitated without contact with respect to the stator, the rotor being actively magnetically levitated in a radial plane perpendicular to the axial direction, the hub of the impeller completely enclosing the magnetically effective core of the rotor, and the stator being encapsulated in a stator housing made of a low-permeable material.

Preferably, the fluid flow is an air flow.

In order to enable a very compact design of the fan, the electromagnetic rotary drive of the fan is designed according to the principle of the bearingless motor. In the meantime, the bearingless motor is sufficiently known to the person skilled in the art, so that a detailed description of its function is no longer necessary. The stator is designed as a bearing and drive stator with which the rotor can be magnetically driven without contact—i.e. rotated—in the axial direction in the operating state and can be magnetically levitated without contact with respect to the stator. The axial direction is determined by the desired rotational axis of the rotor.

The term bearingless motor refers to the fact that the rotor is magnetically levitated without contact, wherein no separate magnet bearings are included. The stator is both the stator of the electric drive and the stator of the magnetic bearing. The stator comprises windings, with which a magnetic rotary field can be generated, which on the one hand exerts a torque on the rotor, which causes its rotation, and which on the other hand exerts a freely adjustable transverse force on the rotor, so that its radial position—i.e. its position in the radial plane—can be actively controlled or regulated. Thus, at least three degrees of freedom of the rotor can be actively regulated. With respect to its deflection in the axial direction, the rotor is passively magnetically stabilized by reluctance forces, i.e. it is not controllable. The rotor is also passively magnetically stabilized with respect to the remaining two degrees of freedom, namely tilts with respect to the radial plane perpendicular to axial direction.

It is an essential aspect of the principle of the bearingless motor that in the bearing and drive stator no distinction can be made between a bearing unit and a drive unit. From the state of the art, for example, electromagnetic drive and bearing devices are known, in which the stator of the drive and the stator of the magnetic bearing are combined to form a structural unit. The stator comprises one or a plurality of bearing units as well as a drive unit, which can be arranged between two bearing units, for example. Such devices thus show a bearing unit that can be separated from the drive unit which serves exclusively for magnetic bearing. However, such devices are not to be understood as bearingless motors in the sense of the present application, because they actually have separate bearing units which, separate from the drive function, realize the bearing of the rotor. In the case of a bearingless motor in the sense of the present application, it is not possible to divide the stator into a bearing unit and a drive unit. It is precisely this characteristic that gives the bearingless motor its name.

It is further essential aspect of the present disclosure that both the magnetically effective core of the rotor and the stator are completely and preferably hermetically enclosed. In this way, the magnetically effective core of the rotor and the stator and in particular, for example, the windings on the stator or the coil cores of the stator, are reliably protected, in particular also in chemically aggressive environments in which the fan comes into contact with corrosive gases, vapors or other corrosive or acidic fluids, for example. The magnetically effective core of the rotor and the stator are also reliably protected against abrasive fluids such as slurry. By completely enclosing the magnetically effective core and the stator, the fan has at least a significantly reduced wear and a considerably longer service life, even in aggressive environments.

The magnetically effective core of the rotor is completely enclosed in the hub of the impeller, which thus forms a sheathing of the rotor. The stator is encapsulated in the stator housing, which is made of a low-permeable material, i.e. a material which has only a low magnetic permeability (magnetic conductivity). This low-permeable material can be a plastic, for example. Within the framework of this application, low-permeable materials are understood to be those materials, as is common practice, whose permeability number (relative permeability) deviates only slightly or not at all from 1 (permeability number of the vacuum). In any case, a low-permeable material has a permeability number that is less than 1.1.

Due to the complete sheathing of the magnetic core of the rotor and the stator, both the hub enclosing the magnetically effective core of the rotor and a wall of the stator housing must be arranged in the magnetic air gap between the rotor and the stator. This requires a large distance between the magnetically interacting parts of the rotor and the stator with respect to the radial direction, i.e. the magnetic air gap in the magnetic circuit of the rotor and stator is large. Surprisingly, despite this large magnetic air gap, a reliable and stable bearing of the rotor with respect to the stator is possible.

Preferably the impeller is made of a first plastic and the stator housing is made of a second plastic. The first and second plastic can be the same plastic, or the first and second plastic can be different plastics.

According to a preferred embodiment, the fan comprises a substantially tubular housing with a suction side and with a pressure side, wherein the rotor and the stator housing are arranged in the housing, and wherein the stator housing is fixed in the housing by a plurality of struts. This allows the fan to be easily integrated into a pipe or pipe system to generate a desired flow or pressure there, for example. For this purpose, the housing of the fan can comprise a flange on both the suction side and the pressure side in each case, by which the fan can be attached to a pipe. The struts with which the stator housing is fixed can advantageously be designed as a diffuser for the fan.

A further preferred measure is that the stator housing has a first housing portion and a second housing portion, the first housing portion being arranged within the rotor and being surrounded by the magnetic core of the rotor, and the second housing portion having an outer diameter which is at least as large as an outer diameter of the magnetically effective core of the rotor. This optimized shape of the stator housing allows additional components such as the power electronics for the electromagnetic rotary drive to be arranged in the stator housing and thus be protected by the stator housing.

Preferably, the fan comprises a checking device for controlling or regulating the fan, the checking device being arranged in the second housing portion of the stator housing. This measure enables a particularly compact and space-saving design. The entire checking device, which can comprise the power electronics for generating the electromagnetic fields, the regulating device for driving and supporting the rotor and, if necessary, sensors or evaluation units, is integrated or built into the stator housing. Thus, only energy needs to be supplied to the fan and, if necessary, signals, for example to start or stop the fan or to determine the rotational speed. For this purpose, a supply line can be provided, which provides the fan with electrical energy. This supply line is preferably arranged inside one of the struts with which the stator housing is fixed.

Furthermore, it is advantageous if a sensor is provided with which a pressure or a flow rate of the fluid flow can be determined, wherein the sensor is signal-connected to the checking device, and the checking device is designed for regulating or controlling the pressure or the flow rate. In this way, for example, the fluid flow generated by the fan can be controlled or regulated. The sensor can be arranged on the suction side or on the pressure side. In particular, the sensor can also be fixed to the stator housing.

According to a preferred embodiment, the stator comprises a plurality of coil cores each of which extending in the radial direction, each coil core carrying a concentrated winding for generating a rotating electromagnetic field. Particularly preferably, the stator has exactly six coil cores, each of which carries a concentrated winding.

In a preferred embodiment, the magnetically effective core of the rotor comprises an annular reflux and a plurality of permanent magnets, the reflux being designed contiguously and made of a soft magnetic material, and each permanent magnet being designed with a sickle-shaped cross-section and being fitted into the radially inside side of the reflux. On the one hand, with this embodiment very good torque and very good stiffness of the magnetic bearing can be achieved and on the other hand the costs for the permanent magnets are reduced, because particularly little permanent magnetic material is needed.

A further advantageous measure is that a heat conducting element for dissipating heat is provided in the stator housing, the heat-conducting element being designed in such a way that it surrounds at least the checking device. The heat conducting element is preferably a metallic heat conducting element and consists, for example, of aluminum. The heat conducting element can, for example, be cup-shaped so that it extends along the inner wall of the second housing portion.

In order to support the magnetic bearing of the rotor, the rotor is preferably designed for the fluid-dynamic stabilization of the rotor against tilting. Due to this fluid-dynamic stabilization, the magnetic bearing is also advantageously attenuated with respect to the axial direction, so that oscillation of the axial bearing can be prevented.

There are various measures for the fluid-dynamic stabilization, some of which are now mentioned in a non-exhaustive list:

The hub of the impeller has a suction-side end and a pressure-side end, wherein the magnetically effective core of the rotor is arranged closer to the pressure-side end than to the suction-side end of the hub with respect to the axial direction. This means that the magnetically effective core is not centered in the hub of the impeller with respect to the axial direction but is displaced in the direction of the pressure side.

The hub of the impeller can comprise an inlet area at its suction-side end, in which the hub is designed tapering in the direction of the suction-side end.

The impeller can be designed in such a way that each blade has a leading edge, each leading edge extending perpendicularly to the axial direction.

The impeller can be designed in such a way that each blade has a trailing edge, each trailing edge opening into the hub at an angle to the axial direction different from 90°.

The impeller can be designed in such a way that each blade has a trailing edge, wherein at least one stabilizing ring is disposed at the trailing edges, which is arranged coaxially with the rotor.

It is also possible to design the impeller in such a way that each blade opens into the hub with respect to the axial direction at a position, which is located between the suction-side end and the pressure-side end of the hub.

Embodiments of the fan are possible in which only any of the mentioned measures is realized, as well as such embodiments in which any combination of the mentioned measures is realized.

Further advantageous measures and embodiments of the disclosure result from the dependent claims.

BRIEF DESCRIPTION OF THE DRAWINGS

Embodiments of the invention will be explained in more detail hereinafter with reference to the drawings.

DETAILED DESCRIPTION OF THE EMBODIMENTS

Figure 1:
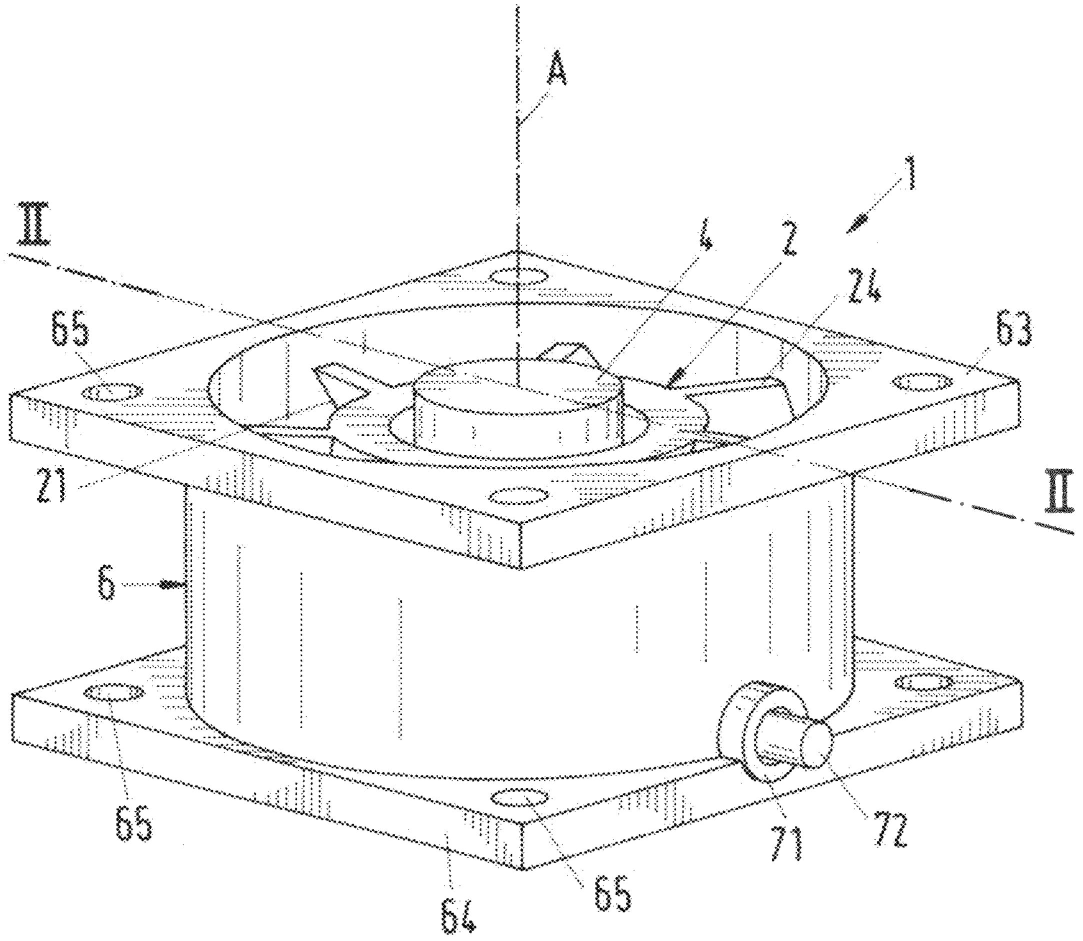
FIG. 1 is a perspective view of an embodiment of a fan according to the invention.
Figure 2:
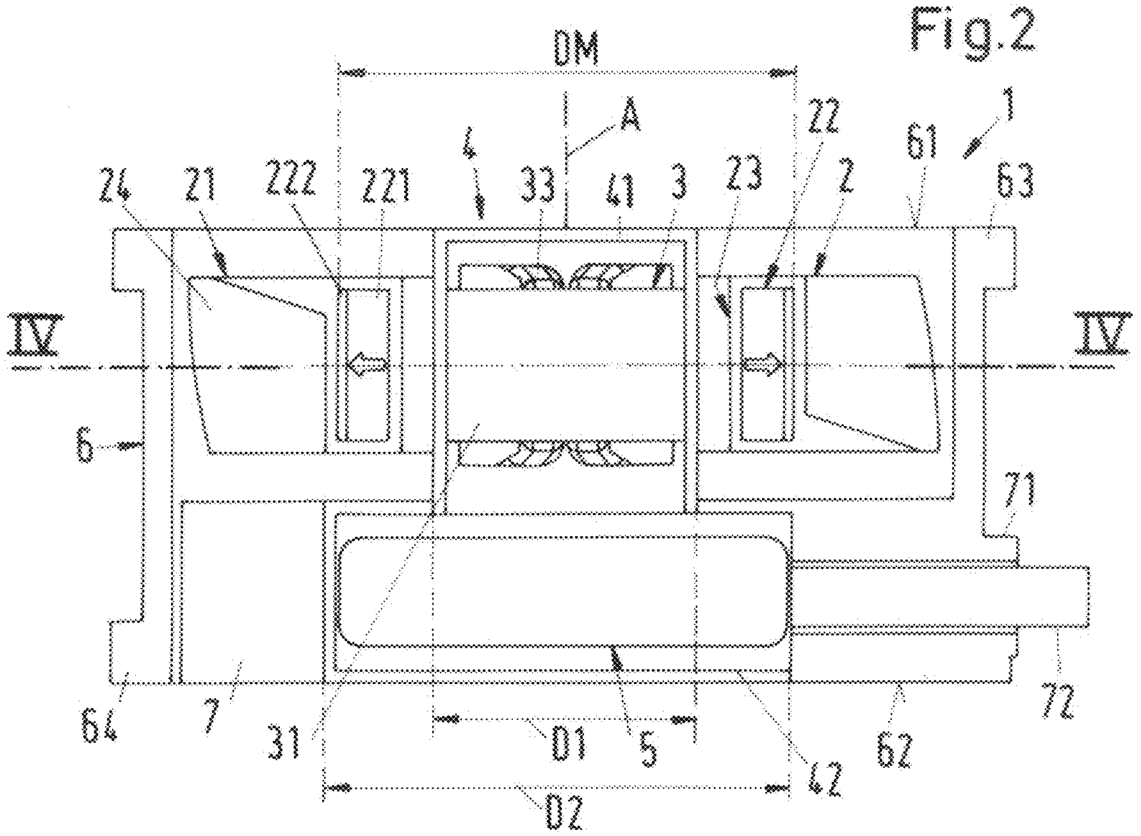
FIG. 2 is a section in the axial direction through the embodiment along the section line II-II in FIG. 1.
Figure 3:
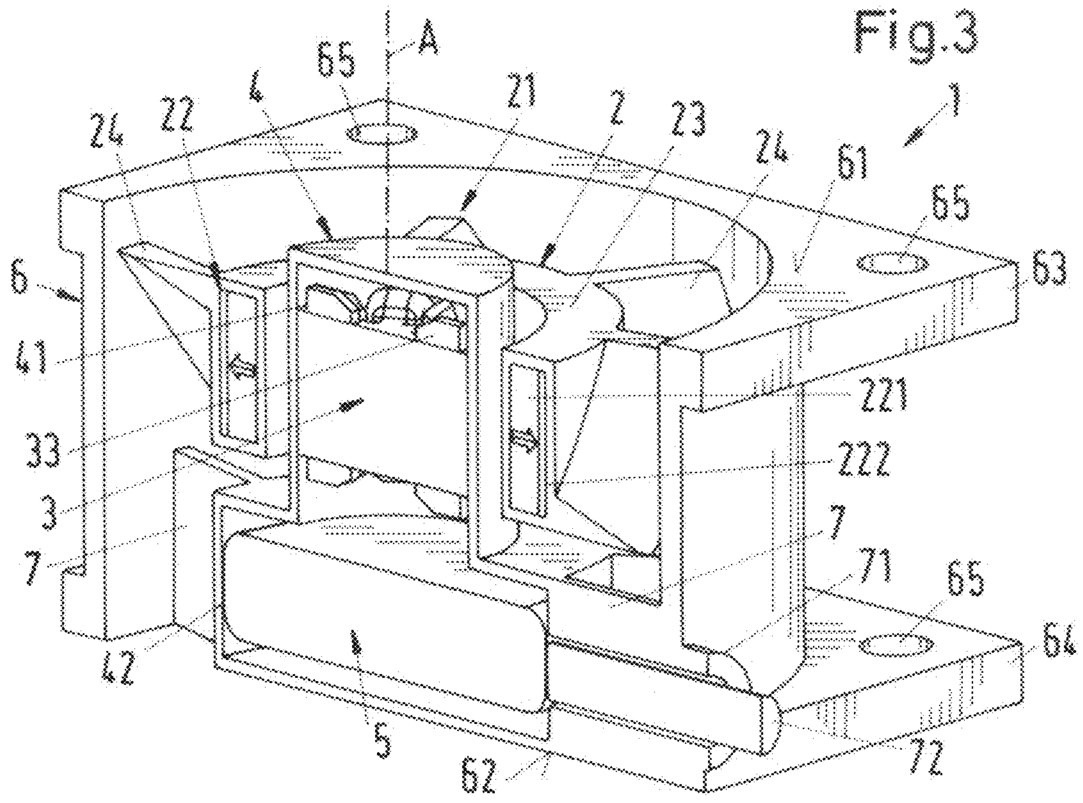
FIG. 3 is as FIG. 2, but in a perspective view.

FIG. 1 shows in a perspective view an embodiment of a fan according to the disclosure which is designated as a whole by the reference sign 1. For better understanding, FIG. 2 and FIG. 3 still show two sectional views of this embodiment according to the section line II-II in FIG. 1, whereby FIG. 2 shows a plan view to the section surface, and FIG. 3 shows the section in a perspective view.

The fan 1 comprises a rotor 2 for generating a fluid flow, for example an air flow or a gas flow, and a stator 3 which, together with the rotor 2, forms an electromagnetic rotary drive for rotating the rotor 2 about an axial direction A. The rotor 2 and the stator 3 form a rotary drive which is designed as an external rotor, i.e. the rotor 2 surrounds the stator 3 and rotates around the inside stator 3 in the operating state.

The electromagnetic rotary drive is designed according to the principle of the bearingless motor and comprises the rotor 2, which can be magnetically driven without contact and is designed to be coil-free, and the stator 3, which is designed as a bearing and drive stator, with which the rotor 2 can be magnetically driven without contact about a desired axis of rotation in the operating state and can be magnetically levitated without contact with respect to the stator 3. The desired axis of rotation defines the axial direction A. The stator 3 is arranged inside with respect to the rotor 2.

In the following, the desired axis of rotation, which defines the axial direction A, refers to that axis of rotation around which the rotor 2 rotates when it is in a centered and non-tilted position with respect to the stator 3. The rotor 2 is then centered in a plane, which is perpendicular to the center axis of the stator 3 and is not tilted with respect to this plane. The desired axis of rotation usually coincides with the center axis of the stator 3.

In the following, the directions perpendicular to the axial direction are further generally referred to as radial direction. The radial plane refers to that plane perpendicular to the desired axis of rotation or axial direction A, which is the magnetic center plane of the stator 3. The radial plane defines the x-y plane of a Cartesian coordinate system whose z-axis runs in the axial direction A.

Figure 4:
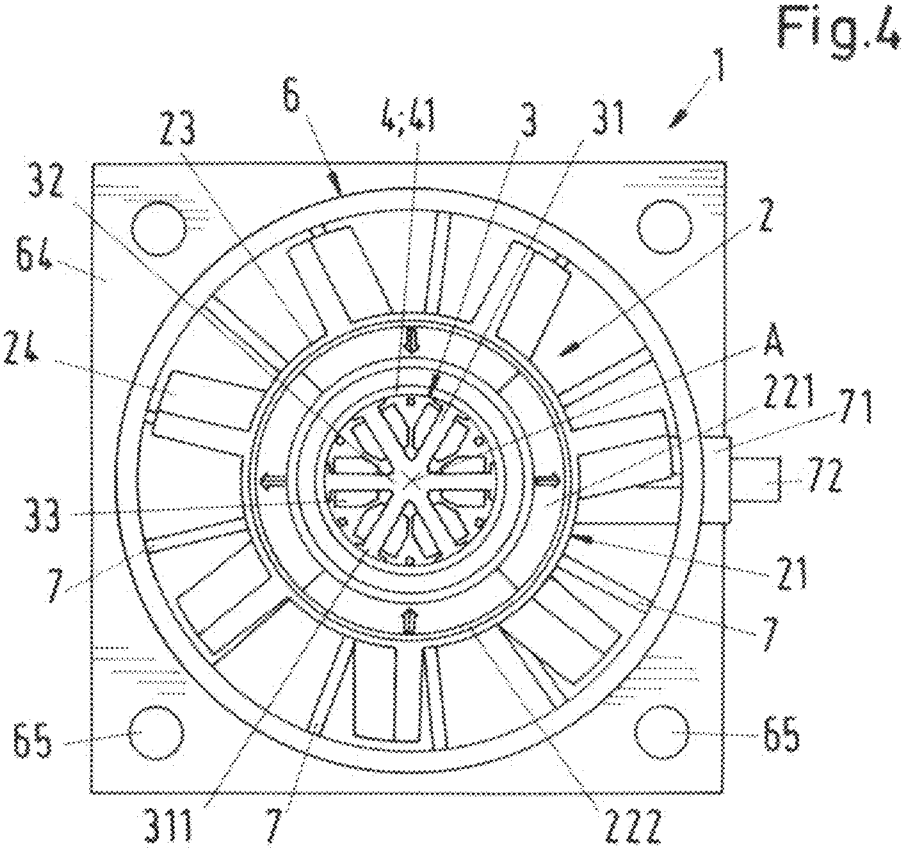
FIG. 4 is a section through the embodiment perpendicular to the axial direction along the section line IV-IV in FIG. 2.
Figure 5:
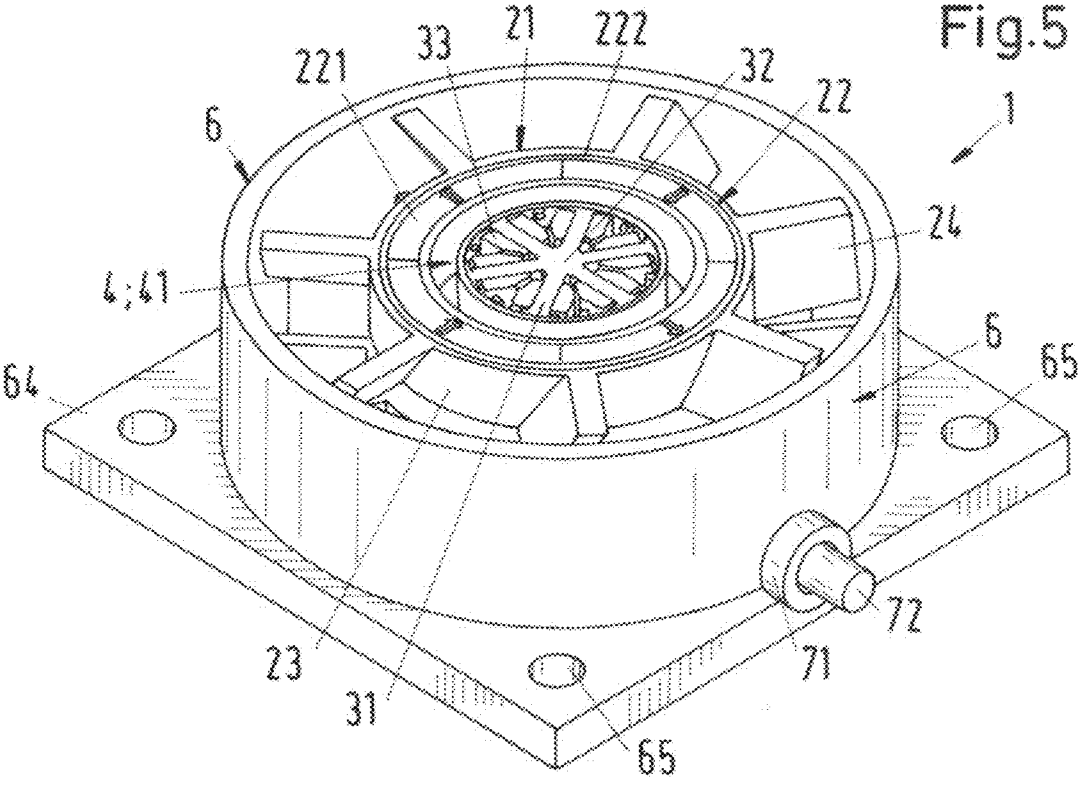
FIG. 5 is as FIG. 4, but in a perspective view.

For better understanding, FIG. 4 and FIG. 5 each show a section through the embodiment illustrated in FIG. 1, wherein the section is perpendicular to the axial direction A in the radial plane, i.e. in the magnetic center plane of the stator 3, as represented in FIG. 2 by the section line IV-IV.

FIG. 4 shows a plan view to the sectional plane, i.e. to the magnetic center plane of the stator 3, and FIG. 5 shows the section in a perspective view.

The rotor 2 of the rotary drive is designed to be coil-free, i.e. no windings are disposed on the rotor 2. The rotor 2 comprises a magnetically effective core 22 which is designed in an annular manner, and an impeller 21 which comprises a hub 23 and a plurality of blades 24, which are arranged on the hub 23. The impeller 21 is designed as an axial impeller. The blades 24 generate the fluid flow in the operating state. The hub 23 and the blades 24 of impeller 21 consist of a first plastic. The rotor 2 is both the rotor 2 of the fan 1, with which the air flow is generated, and the rotor 2 of the electromagnetic rotary drive, with which the rotation of the impeller 21 is driven. This embodiment, also known as integral rotor, enables a particularly compact design of the fan 1.

Figure 9:
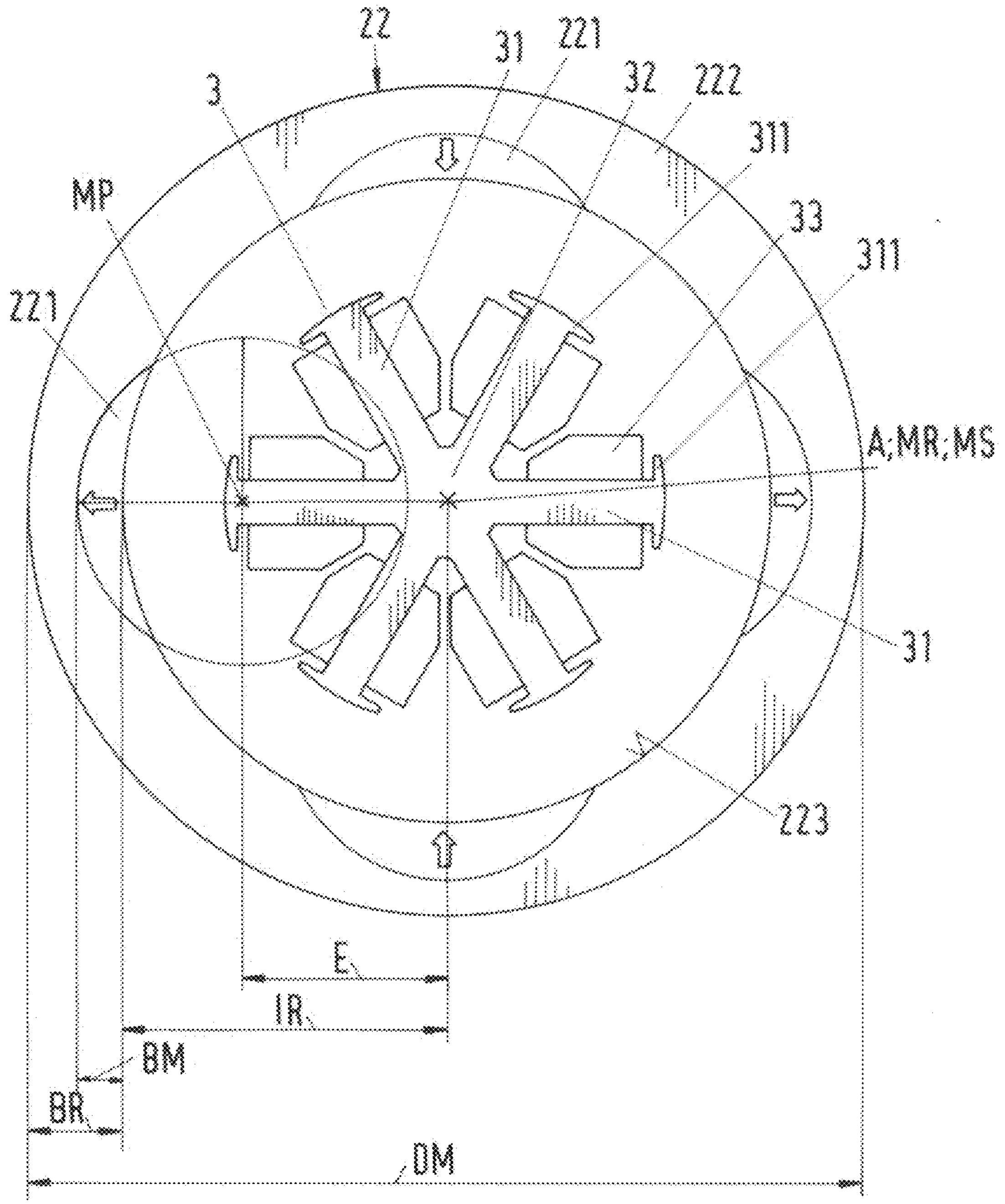
FIG. 9 is as FIG. 8, but for clarifying dimensions.

The magnetically effective core 22 of the rotor 2 is designed in the form of an annular disk or a circular cylindrical ring with the height HR (FIG. 11) in the axial direction A and with the inner radius IR (FIG. 9). The "magnetically effective core 22" of the rotor 2 refers to that area of the rotor 2 which magnetically interacts with the stator 3 for torque generation and for generating the magnetic bearing forces.

The magnetically effective core 22 of the rotor 2 comprises an annular radially outside reflux 222 and at least one permanent magnet 221, which can be designed as a permanent magnetic ring, for example. Of course, it is also possible that a plurality of permanent 221 is included, each of which is designed as a ring segment, for example. In the embodiment described here—see in particular FIG. 4 and FIG. 5—a total of four permanent magnets 221 are provided, which together form a ring. Each permanent magnet 221 is magnetized in radial or diametrical direction, as shown by the arrows without reference signs in FIG. 4 and FIG. 5. Adjacent permanent magnets 221 are each polarized in the opposite direction, i.e. a permanent magnet 221 polarized radially or diametrically inwards and a permanent magnet 221 polarized radially or diametrically outwards are adjacent to each other in each case. Here, the rotor 2 thus is four-pole, i.e. designed with the pole pair number two.

Those ferromagnetic or ferrimagnetic materials which are hard magnetic, that is which have a high coercive field strength, are typically called permanent magnets. The coercive field strength is that magnetic field strength which is required to demagnetize a material. Within the framework of this application, a permanent magnet is understood as a material which has a coercive field strength, more precisely a coercive field strength of the magnetic polarization, which amounts to more than 10,000 A/m. All permanent magnets 221 of the magnetically effective core of the rotor preferably consist of neodymium-iron-boron (NdFeB) or samarium-cobalt (SmCo) alloys.

The magnetically effective core 22 further comprises the annular reflux 222, which is arranged radially outside around all permanent magnets 221. The reflux 222 consists of a ferromagnetic material and serves to guide the magnetic flux. The reflux 222 encloses all permanent magnets 221.

The magnetically effective core 22 of the rotor 2 is arranged in the hub 23 of the impeller 21 so that the hub 23 of the impeller 21 completely encloses the magnetically effective core 22 of the rotor 2 and the hub 23 forms a sheathing for the magnetically effective core 22 of the rotor 2. For this purpose, for example, during the manufacturing process, the magnetically effective core 22 can be encapsulated by molding with the first plastic of which the hub 23 is made. However, it is also possible to provide the hub 23 with an annular recess into which the magnetically effective core 22 is inserted. Subsequently, the annular recess is closed with a suitably shaped plastic cover, which is then connected to the rest of the hub 23, for example by a welding process. Then, the magnetically effective core 22 of the rotor 2 is hermetically encapsulated.

The stator 3 comprises a plurality—here six—of coil cores 31, which are arranged in a star-shaped manner. Each coil core 31 is designed bar-shaped and extends radially outwards from a central pole piece 32 arranged in the center of the stator 3 and ends in a rounded pole shoe 311 (see also FIG. 9), so that each coil core 31 has an essentially T-shaped appearance. The radially outside boundary surfaces of all pole shoes 311 all lie on a circular cylinder which is coaxial with the longitudinal axis of the central pole piece 32.

In order to generate the electromagnetic rotary fields necessary for the magnetic drive and magnetic bearing of the rotor 2, the coil cores carry windings. In the embodiment described here, for example, the windings are designed in such a way that a concentrated winding in each case is wound around each coil core 31 as a discrete coil 33. These coils 33 are used to generate those electromagnetic rotary fields in the operating state with which a torque is effected to the rotor 2 and with which an arbitrarily adjustable transverse force can be exerted on the rotor 2 in the radial direction, so that the radial position of the rotor 2, i.e. its position in the radial plane perpendicular to the axial direction A, can be actively controlled or regulated.

Both the central pole piece 32 and the coil cores 31 of the stator 3 and the reflux 222 of the magnetically effective core 22 of the rotor 2 are each made of a soft magnetic material because they serve as flux conducting elements for guiding the magnetic flux. Suitable soft magnetic materials are for example ferromagnetic or ferrimagnetic materials, in particular iron, nickel-iron or silicon-iron. In particular for the stator 3, a design as a stator sheet metal stack is preferred here, in which the coil cores 31 and the central pole piece 32 are made of sheet metal, i.e. they consist of several thin elements which are stacked. The reflux 222 of the magnetically effective core 22 of the rotor 2 can also be made of sheet metal. As an alternative to the sheet metal design, soft magnetic composite materials consisting of electrically insulated and compressed metal particles can also be used for the rotor and/or the stator. In particular, these soft magnetic composite materials, also described as SMC (soft magnetic composites), can consist of iron powder particles coated with an electrically insulating layer. These SMC are then formed into the desired shape using powder metallurgical processes.

As already mentioned, the electromagnetic rotary drive with the rotor 2 and the stator 3 is designed according to the principle of the bearingless motor, in which the rotor 2 is magnetically driven without contact and magnetically levitated without contact with respect to the stator 3, wherein no separate or separable magnetic bearings are provided for the rotor 2. The bearing function and the drive function are realized with the same stator 3, wherein it is not possible to divide the stator 3 into a bearing unit and a drive unit. The drive function and the bearing function cannot be separated from each other. The term "bearingless motor" has become established for such rotary drives because no separate magnetic bearings or magnetic bearing units are provided for the rotor 2. These particularly efficient bearingless motors are characterized in particular by their extremely compact design with simultaneous realization of the "contactless" concept.

A bearingless motor is thus an electromagnetic rotary drive in which the rotor 2 is magnetically levitated with respect to the stator 3, wherein no separate magnetic bearings or magnetic bearing units are included. For this purpose, the stator 3 is designed as a bearing and drive stator, which is both the stator 3 of the electric drive and the stator 3 of the magnetic bearing. Magnetic rotary fields can be generated with the coils 33 of the bearing and drive stator 3, which magnetic rotary fields, on the one hand, exert a torque on the rotor 2, which causes its rotation and which, on the other hand, exert an arbitrarily adjustable transverse force on the rotor 2 so that its radial position, i.e. its position in the radial plane, can be actively controlled or regulated. The bearingless motor is now well-known to the person skilled in the art, so that a detailed description of its function is no longer necessary.

Thus, three degrees of freedom of the rotor 2 can be actively controlled or regulated, namely its position in the radial plane (two degrees of freedom) and its rotation around the axial direction A. With respect to its axial deflection in the direction of the desired axis of rotation, the rotor 2 is passively magnetically, i.e. not controllable, stabilized or levitated by reluctance forces. The rotor 2 is also passively magnetically stabilized or levitated with respect to the remaining two degrees of freedom, namely tilts with respect to the radial plane perpendicular to axial direction. The radial bearing of the rotor 2 therefore corresponds to the function of an active radial magnetic bearing, and the axial bearing corresponds to the function of a passive axial magnetic bearing.

In contrast to conventional magnetic bearings, the magnetic bearing and the drive of the motor of a bearingless motor are realized via electromagnetic rotary fields. Typically, in the bearingless motor, the magnetic drive and bearing function is generated by the superposition of two magnetic rotary fields, usually referred to as drive and control fields. These two rotary fields generated with the windings or coils 33 of the stator 3 usually have a pole pair number that differs by one. For example, if the drive field has the pole pair number p, the control field has the pole pair number $p+1$ or $p-1$. Tangential forces acting on the rotor 2 in the radial plane are generated with the drive field, resulting in a torque which causes the rotation of the rotor 2 around the axial direction A. By superimposing the drive field and the control field, it is also possible to generate an arbitrarily adjustable transverse force on the rotor 2 in the radial plane, with which the position of the rotor 2 in the radial plane can be regulated. It is therefore not possible to divide the electromagnetic flux generated by the coils 33 of the stator 3 into an (electro-) magnetic flux which only provides the drive of the rotor 2 and an (electro-) magnetic flux which only realites the magnetic bearing of the rotor 2.

On the one hand, to generate the drive field and the control field, it is possible to use two different winding systems, namely one for generating the drive field and one for generating the control field. The coils for generating the drive field are then usually referred to as drive coils and the coils for generating the control field as control coils. The current which is impressed into these coils is then called drive current or control current. On the other hand, it is also possible to generate the drive and bearing function with only one single winding system, so that there is no distinction between drive and control coils. This can be realized in such a way that the values for the drive current and the control current determined by a checking device 5 in each case are added or superimposed by calculation—i.e. for example by software—and the resulting total current is impressed into the respective coils 33. In this embodiment, it is of course no longer possible to distinguish between control and drive coils. In the embodiment described here, the latter variant is realized, i.e. there is no distinction between drive and control coils, but there is only one winding system in whose six coils 33 the mathematically determined sum of the drive and control current is impressed. However, it is of course also possible to design the fan 1 according to embodiments of the disclosure with two separate winding systems, namely with separate drive coils and separate control coils.

The sensor technology, e.g. for determining the position of the rotor, the control, the supply and the regulation of the rotary drive designed as a bearingless motor are well known to the person skilled in the art and do not require any further explanation here.

In the fan 1 according to the disclosure, not only the magnetically effective core 22 of the rotor 2 is completely enclosed by the hub 23 of the impeller 21, but the stator 3 is also encapsulated in a stator housing 4 made of a low-permeable material. This low-permeable material is preferably a second plastic.

A low-permeable material is a material that has only a low magnetic permeability (magnetic conductivity). Within the framework of this application, low-permeable materials are understood to be those materials—as is common practice—whose permeability number (relative permeability) deviates only slightly or not at all from 1 (permeability number of the vacuum). In any case, a low-permeable material has a permeability number that is less than 1.1. The low-permeable material therefore has a significantly lower magnetic conductivity than, for example, the ferromagnetic material from which the coil cores 31 are made.

As already mentioned, this low-permeable material from which the stator housing 4 is made is preferably a second plastic. Thus, preferably the impeller 21 of the rotor 2 is made of the first plastic and the stator housing 4 is made of a second plastic. Of course, it is possible and for many applications also preferred that the first plastic and the second plastic are the same plastic. On the other hand, it is also possible that the first plastic and the second plastic are different plastics.

For example, the first and/or the second plastic can be one of the following plastics: polyethylene (PE), low density polyethylene (LDPE), ultra low density polyethylene (ULDPE), ethylene vinyl acetate (EVA), polyethylene terephthalate (PET), polyvinyl chloride (PVC), polypropylene (PP), polyurethane (PU), polyvinylidene fluoride (PVDF), acrylonitrile butadiene styrene (ABS), polyacrylic, polycarbonate (PC), or silicone. For many applications, the materials polytetrafluoroethylene (PTFE) and perfluoroalkoxy-polymers (PFA), known under the brand name Teflon, are also suitable as the first and/or the second plastic.

Preferably, one of these plastics is used as the first plastic to hermetically encapsulate the magnetically effective core 22 of the rotor 2, and one of these plastics is used as the second plastic to hermetically encapsulate the stator 3. Since it is sufficient for the understanding, no distinction will be made in the following between the first and the second plastic.

Since all mentioned plastics are low-permeable, i.e. they conduct the magnetic flux poorly, the areas of the hub 23 and the stator housing 4 arranged in the radial direction between the magnetically effective core 22 of the rotor 2 on the one hand and the pole shoes 311 of the coil cores 31 of the stator 3 on the other hand are to be assigned to the magnetic air gap between the rotor 2 and the stator 3. The magnetic air gap between the rotor 2 and the stator 3 is thus equal to the distance in the radial direction between the magnetically effective core 22 of the rotor 2 and the pole shoes 311 of the coil cores 31 of the stator 3. Therefore, the hermetic encapsulation of the magnetically effective core 22 and the hermetic encapsulation of the stator 3 induce a magnetic air gap that is large compared to other bearingless motors. The width of the magnetic air gap, for example, is 4 mm or even more when the rotor 3 is centered. This means that with a width of the magnetic air gap of 4 mm, the maximum diameter of the stator 3 measured from one pole shoe 311 to the opposite pole shoe 311 is 8 mm smaller than the inner diameter of the magnetically effective core 22 of the rotor 2.

The fan 1 further comprises a housing 6, which is substantially tubular in shape and coaxially surrounds the impeller 21 of the rotor 2. The housing 6 has a suction side 61 (FIG. 2, FIG. 3), through which the fan 1 sucks in the air, and a pressure side 62, through which the fan 1 ejects the air. The rotor 2 and the stator 3 enclosed by it and the entire stator housing 4 are arranged in the tubular housing 6 between the suction side 61 and the pressure side 62, wherein the stator housing 4 is preferably attached to the pressure side 62 of the housing 6 via a plurality of struts 7. Each strut 7 extends from the stator housing 4 outwards in the radial direction to the inner wall of the tubular housing 6. The total of struts 7 can be designed as a diffuser. Preferably, the struts 7 are made of the first plastic or the second plastic.

The housing 6 further has a suction-side flange 63 on the suction side 61 and a pressure-side flange 64 on the pressure side 62. By the flanges 63 and 64, the fan 1 can be integrated in a simple way into a pipe or pipe system (see e.g. FIG. 22). In the embodiment described here, both flanges 63, 64 are designed in rectangular and particularly square shape, and in each corner of each flange 63, 64 a mounting hole 65 is disposed in each case for the respective receiving of a fastening means (fastener), e.g. a screw (not shown), so that the fan 1 can be attached in a simple way to another element, for example to another flange.

The stator housing 4 comprises a first housing portion 41 and a second housing portion 42 which are arranged one above the other with respect to the axial direction A, the first housing portion 41 being arranged on the suction side 61 of the housing 6 and the second housing portion on the pressure side 62 of the housing 6. Each housing portion 41, 42 has a cylindrical shape, the outer diameter D2 (FIG. 2) of the second housing portion 42 being larger than the outer diameter D1 of the first housing portion 41. In total, the stator housing 4 encloses a space that is created when an L is rotated around the long leg.

The outer diameter D1 of the first housing portion 41 is smaller than the inner diameter of a central recess in the hub 23 of the rotor 2, so that the first housing portion 41 can be inserted into this central recess. The stator 3 of the electric rotary drive is arranged in the first housing part 41 of the stator housing 4, so that the stator 3 is surrounded by the magnetically effective core 22 of the rotor 2 when the stator housing 4 is inserted into the central recess in the hub 23 of the rotor 2. This results in the usual arrangement of a rotary drive for an external rotor, in which the stator 3 is surrounded radially inwardly inside by the rotor 2.

The outer diameter D2 of the second housing portion 42 of the stator housing 4 is dimensioned such that it is at least as large as the outer diameter DM of the magnetically effective core 22 of the rotor 2. The struts 7, with which the stator housing 4 is fixed in the housing 6, are arranged on the second housing portion 42 and extend from there in a radial direction to the inner wall of the housing 6 in each case. In the second housing portion 42 of the stator housing 4, which is arranged below the rotor 2 according to the representation, the checking device 5 is provided with which the fan 1 is driven and regulated. The checking device 5 comprises the power electronics, with which the current for the coils 33 is generated, and a regulating and control device, with which the drive of the rotor 2 and the radial position of the rotor 2 is regulated or controlled. In the same way, the checking device 5 can comprise a flow circuit and/or a pressure control circuit which can be activated after the connection of an optional pressure or flow sensor. The power electronics is preferably designed as a circuit board or a printed circuit board (PCB). Furthermore, the checking device 5 can comprise different sensors and an evaluation unit for processing the signals supplied by the sensors. Due to the fact that the entire checking device 5 is also arranged in the stator housing 4, an extremely compact and space-saving design of the fan 1 is achieved. In addition, the checking device 5 in the hermetically sealed stator housing 4 is also protected against chemically aggressive environmental conditions as well as dust and dirt.

Figure 22:
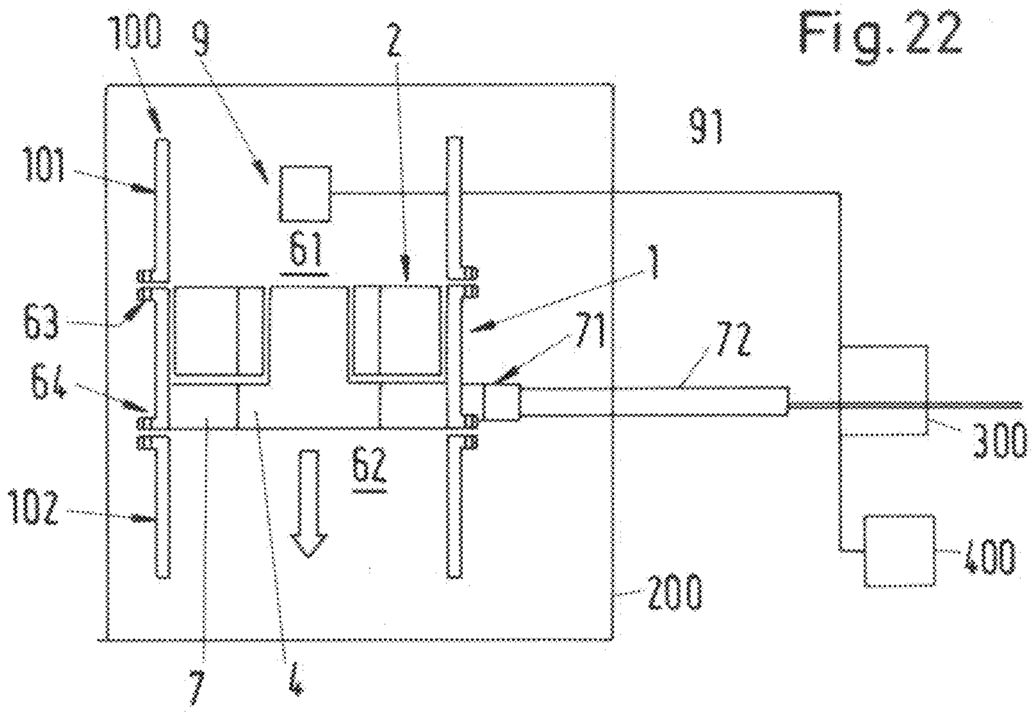
FIGS. 22-24 are schematic views for different variants of an embodiment of a fan according to the invention, arranged in a pipe.

Furthermore, a feed-through 71 is provided for a cable 72, via which the checking device 5 is supplied with energy. The cable 72 can further be used for the transmission of analogue or digital signals to the checking device 5 or from the checking device 5. For this purpose, the cable 72 is connected, for example, to a voltage source and to a communication interface 400 (FIG. 22). The feed-through 71 from the second housing portion 42 of the stator housing 4 to the surroundings of the fan 1 is particularly preferred disposed in one of the struts 7 or the feed-through 71 functions as one of the struts 7.

Since both the magnetically effective core 22 of the rotor 2 and the stator 3 and the checking device 5 are thus hermetically encapsulated, the fan 1 is excellently suited for use in problematic environments such as those found in the semiconductor industry. Corrosive vapors, gases or even acidic substances can be present here, which can cause considerable damage to conventional fans after only a short period of operation. However, the fan 1 is also particularly resistant to mechanical soiling of the environment, for example dust or solid particles. Due to the bearingless concept and the hermetic encapsulation of the stator 3 and the magnetically effective core 22 of the rotor 2, the fan 1 is particularly suitable for use in high-purity environments or for conveying high-purity gases such as those used in laser technology.

Figure 6:
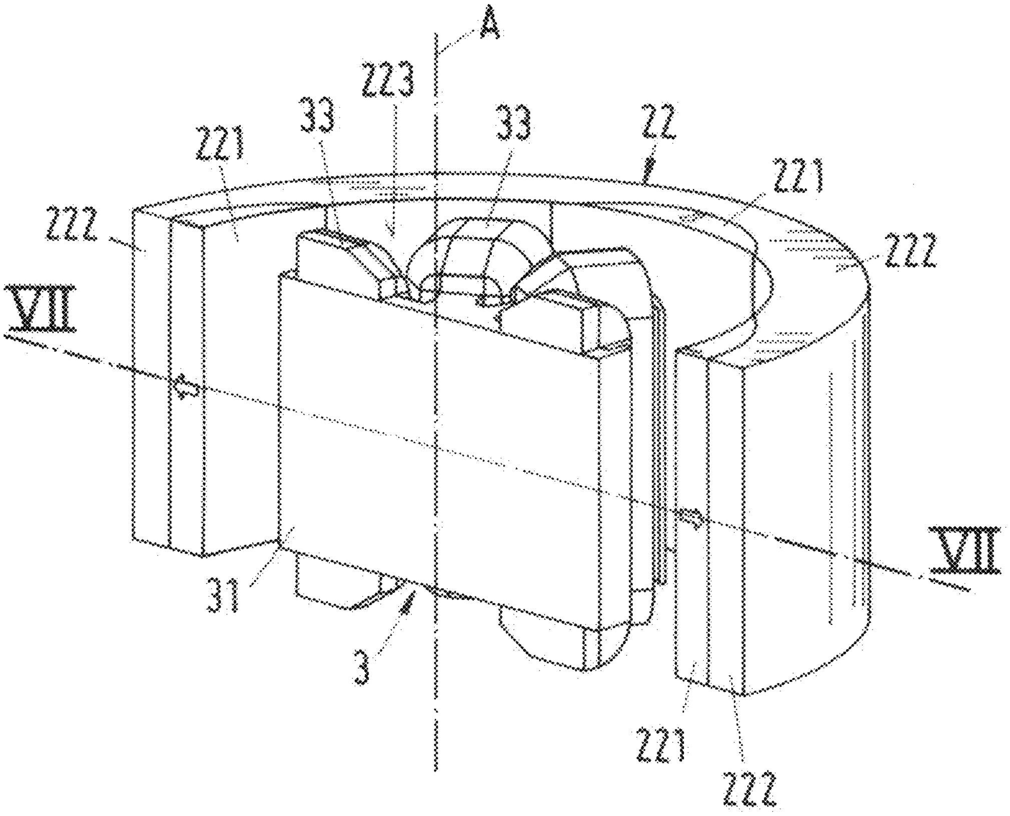
FIG. 6 is a section in the axial direction through the stator and the magnetically effective core of the rotor for a variant of the magnetically effective core of the rotor in a perspective view.
Figure 7:
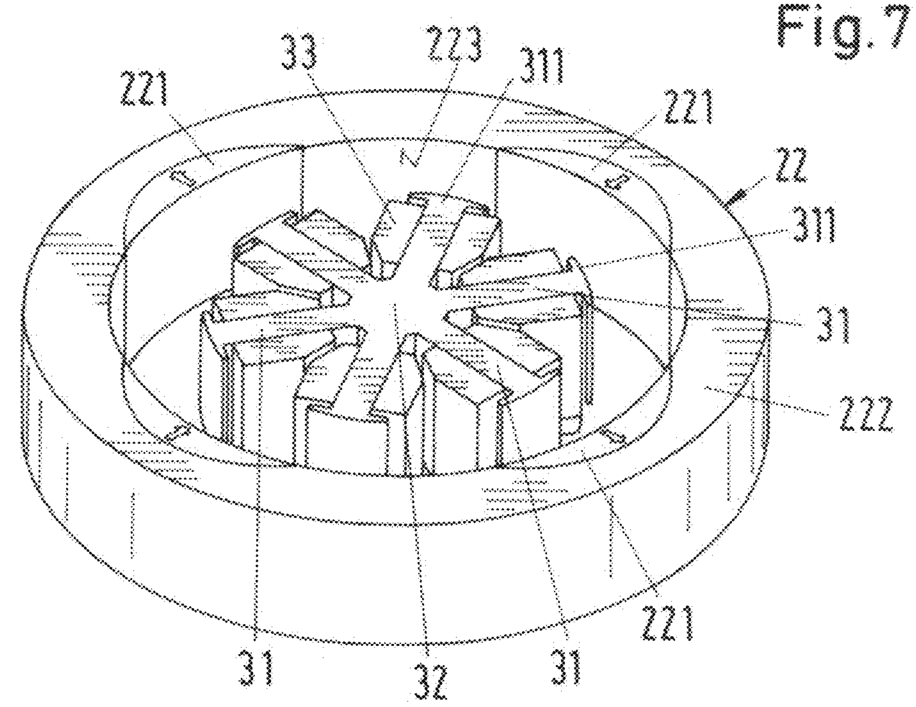
FIG. 7 is a section perpendicular to the axial direction through the stator and the magnetically effective core of the rotor of FIG. 6 in a perspective view along the section line VII-VII in FIG. 6.
Figure 8:
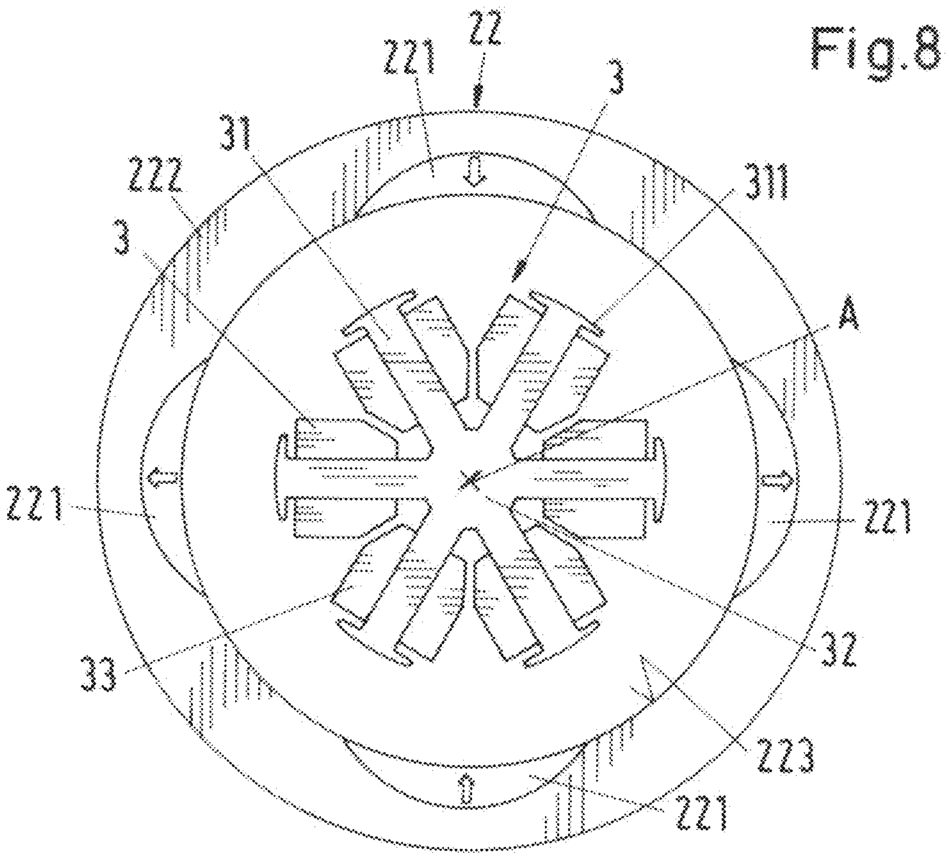
FIG. 8 is as FIG. 7, but in a plan view to the section surface.

FIG. 6-FIG. 8 show a preferred variant for the design of the magnetically effective core 22 of the rotor 2. Since it is sufficient for understanding, only the magnetically effective core 22 of the rotor 2 and the stator 3 are shown in FIG. 6, FIG. 7 and FIG. 8 for reasons of better overview. FIG. 6 shows the variant in a perspective sectional view, wherein the section is made in the axial direction A through the center of the central pole piece 32 of the stator 3.

FIG. 7 shows this variant for the magnetically effective core 22 of the rotor 2 in a perspective sectional view along the section line VII-VII in FIG. 6. The section is made perpendicular to the axial direction A through the center of the stator 3. FIG. 8 shows a plan view to the section surface of FIG. 7.

In this also annular variant for the magnetically effective core 22 of the rotor 2, the annular reflux 222 and a plurality of permanent magnets 221, here four, are disposed radially outside. The reflux 222 is designed contiguously and made of a soft magnetic material. Each of the four permanent magnets 221 is designed in such a way that it has a sickle-shaped cross-section perpendicular to the axial direction A and extends over the entire height HR (FIG. 11) of the magnetically effective core 22 of the rotor 2 with respect to the axial direction A. The permanent magnets 221 are arranged equidistantly with respect to the circumferential direction on the radially inside side of the reflux 222 and are fitted into correspondingly shaped recesses in the radially inside side of the reflux 222.

Thus, each permanent magnet 22 is bounded in the radial direction by two circular cylinder segments, namely radially inside by a circular cylinder segment which has the same radius and the same center as the radially inside boundary surface 223 of the magnetically effective core 22 of the rotor 2, and radially outside by a circular cylinder segment whose center is displaced from the center of the radially inside boundary surface 223 of the magnetically effective core 22 and whose radius is smaller than the radius of the radially inside boundary surface of the magnetically effective core 22.

Each permanent magnet is magnetized in radial or diametrical direction, as indicated by the arrows without reference signs in FIG. 6-FIG. 8. The permanent magnets 221 are magnetized alternately in the radial or diametrical direction to the outside and in the radial or diametrical direction to the inside with respect to the circumferential direction of the rotor 2, so that respective adjacent permanent magnets 221 are magnetized in the opposite direction. The rotor 2 is thus designed with four poles, i.e. with the pole pair number 2.

For a fan 1 that is as powerful and efficient as possible, a high rotational speed of the rotor 2 is preferred, which is why the rotor 2 is preferably designed with four poles.

Particularly also with regard to a reliable contactless magnetic bearing of the rotor 2, it is particularly preferred that the annular disk-shaped magnetically effective core 22 of the rotor 2—regardless of its specific design—has an inner diameter which is at least 1.5 times and preferably twice as large as the height HR (FIG. 11) of the magnetically effective core 22 in the axial direction A. If the height HR, when viewed in the radial direction, changes over the magnetically effective core 22, i.e. it is not constant, then at least at the radially inside boundary surface 223 of the magnetically effective core 22 the condition should be fulfilled that the inner diameter of the magnetically effective core 22 is at least 1.5 times and preferably twice as large as the height HR of the magnetically effective core 22. This means that HR designates the height of the magnetically effective core 22 at its radially inside boundary surface 223.

Figure 10:
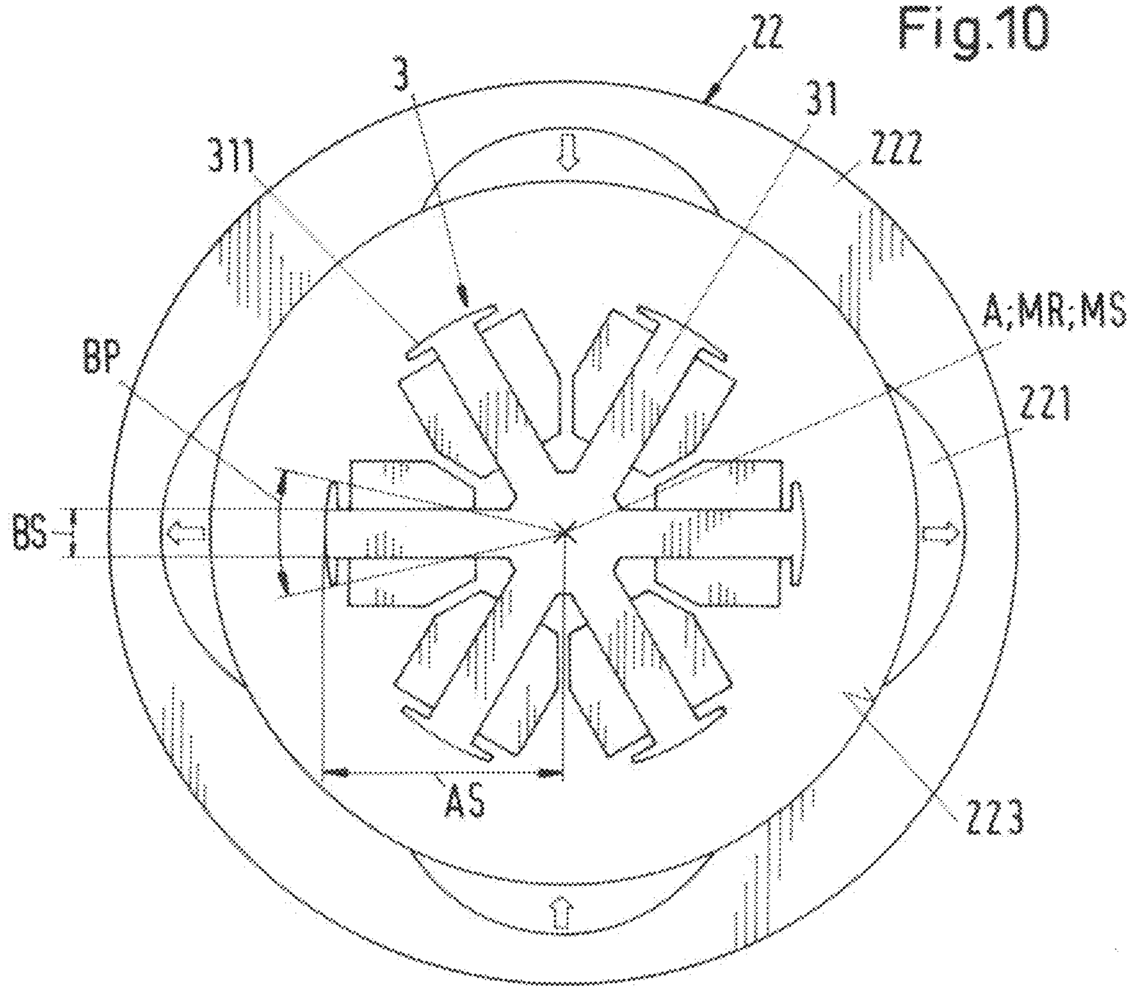
FIG. 10 is as FIG. 9, but for clarifying further dimensions.
Figure 11:
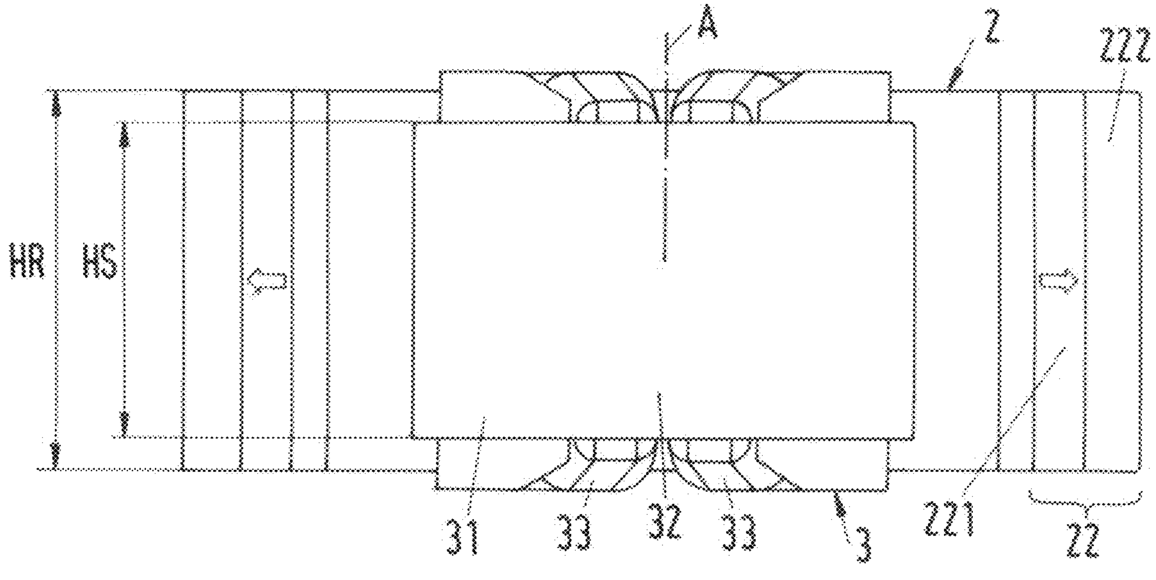
FIG. 11 is as FIG. 6, but in a plan view to the section surface.

In the following, some preferred geometric dimensions for the magnetically effective core 22 of the rotor 2 and for the stator 3 are explained on the basis of FIG. 9 to FIG. 11, which are particularly favorable with regard to the contactless drive of the rotor 2 and the contactless magnetic bearing of the rotor 2. FIG. 9 and FIG. 10 basically show the same illustration as FIG. 8 in each case, i.e. a section perpendicular to the axial direction A, but some dimensions are drawn in. FIG. 11 basically shows the same illustration as FIG. 6, i.e. a section in the axial direction A, but some dimensions are drawn in.

MR designates the geometric center of the annular magnetically effective core 22 of the rotor 2 in the radial plane.

IR designates the inner radius of the magnetically effective core 22. This means that IR designates half the inner diameter of the magnetically effective core 22.

HR designates the height of the magnetically effective core 22 in the axial direction A at the radially inside boundary surface 223 of the magnetically effective core 22.

BM designates the maximum thickness of the permanent magnets 221 in the radial direction.

BR designates the thickness of the magnetically effective core 22 in the radial direction.

MP designates the geometric center of the circular cylinder segment lying in the radial plane, which forms the radially outside boundary of the permanent magnet 221.

E designates the distance of the center MP from the center MR of the magnetically effective core 22 of the rotor 2.

MS designates the geometrical center of the stator 3 or the central pole piece 32 of the stator 3 in the radial plane.

AS designates the outer radius of the stator 3, i.e. the radius of the circular cylinder on which the pole shoes 311 are arranged.

BP designates the opening angle of the pole shoes 311 of the coil cores 31 of the stator 3. This opening angle BP is that angle, which the two connecting lines connecting the center MS with the two ends of a pole shoe 311 when viewed in the circumferential direction enclose. i.e. the connecting lines from the two ends of the short leg of the T of the essentially T-shaped coil cores 31 to the center MS.

BS designates the width of the coil cores 31 in the radial plane.

HS designates the height of the coil cores 21 in the axial direction A. If the height HS of the coil cores 21 changes in the radial direction, HS designates the height of the coil cores 31 at the radially outside ends, i.e. at the pole shoes 311. In the embodiment described here, the height HS is constant when viewed in the radial direction, and the central pole piece 32 also has the height HS in the axial direction A.

The following relative dimensions are preferred:

The ratio BM to BR is preferably 0.5 to 0.9 and particularly preferred 0.7.

The ratio E to IR is preferably 0.25 to 0.65 and particularly preferred 0.45.

The ratio BS to AS is preferably 0.25 to 0.45 and particularly preferred 0.35.

The ratio HR to HS is preferably 1.5 to 2.5 and particularly preferred 2.0.

The opening angle BP of the pole shoes 311 is preferably 30° to 45° and particularly preferred 40°.

A further preferred measure is to provide a heat conducting element 8 in the stator housing 4 in order to distribute or dissipate in the best possible way the heat produced, for example, by the power electronics of the checking device 5 and/or the heat produced by the stator 3 through the flowing current. The heat conducting element 8 consists of a material with good thermal conductivity, for example a metallic material. Preferably, the heat conducting element 8 is made of aluminum. In the following, different variants for the heat conducting element 8 are explained, wherein the heat conducting element 8 is preferably always made of aluminum.

Figure 12:
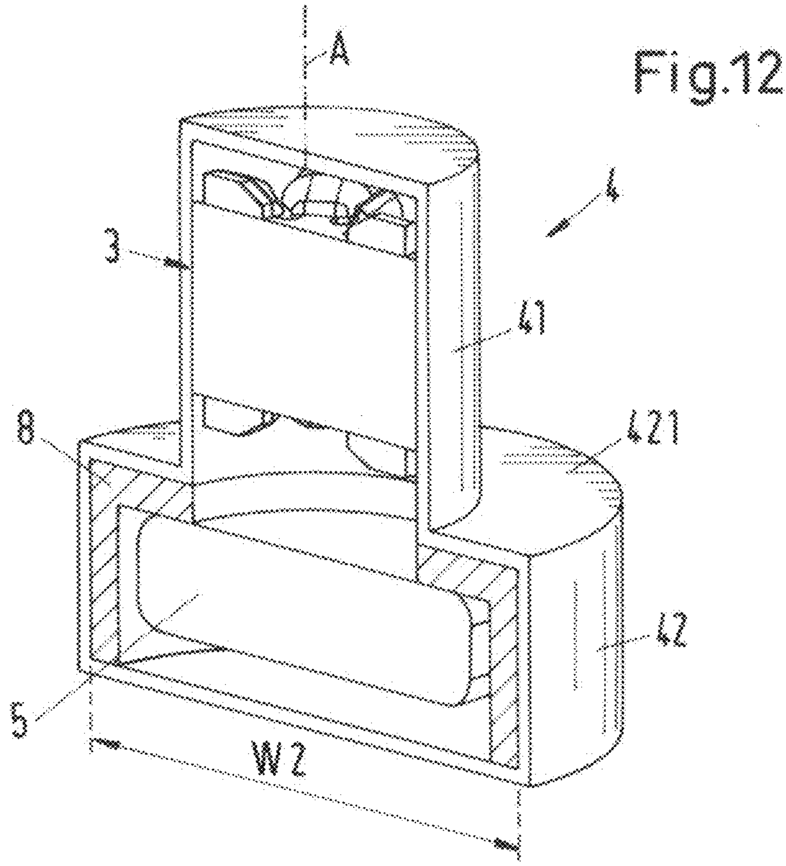
FIG. 12 is a section in the axial direction through a first variant for the design of the stator housing with a heat conducting element in a perspective view.

FIG. 12 shows in a perspective sectional view a first variant for the design of the stator housing 4 with the heat conducting element 8. The heat conducting element 8 is designed and arranged in such a way that it surrounds at least the checking device 5, so that the heat generated by the power electronics in particular is distributed as well as possible.

In the variant represented in FIG. 12, the heat conducting element 8 is designed as a sleeve which extends completely along the inner cylindrical wall of the second housing portion 42 of the stator housing 4, in which the checking device 5 is arranged. The heat conducting element 8 rests directly on the inside of the cylindrical wall of the second housing portion 42. The heat conducting element 8 which is designed as a sleeve has thus an outer diameter W2 which corresponds to the inner diameter of the cylindrical second housing portion 42 of the stator housing 4. The heat conducting element 8 has a rotationally symmetrical L-profile, so that the annular area 421, which bounds that end face of the second housing portion 42 which projects beyond the first housing portion 41 in the radial direction and is thus arranged under the rotor 2 according to the representation, is also lined on its inside with the heat conduction element 8. Due to this measure, the heat generated by the checking device 5 in particular is distributed over a large area on the wall of the second housing portion 42. Due to this measure, sufficient heat can be dissipated from the stator housing 4 despite of the thermally poorly conducting plastic from which the stator housing 4 is preferably made. The heat is distributed over as large an area as possible on the inner wall of the second housing section 42 and introduced into the plastic. In addition, it is preferred that the heat is fed into that area of the stator housing 4 that experiences a particularly strong fluid-dynamic flow in the operating state, through which the heat is reliably dissipated.

Figure 13:
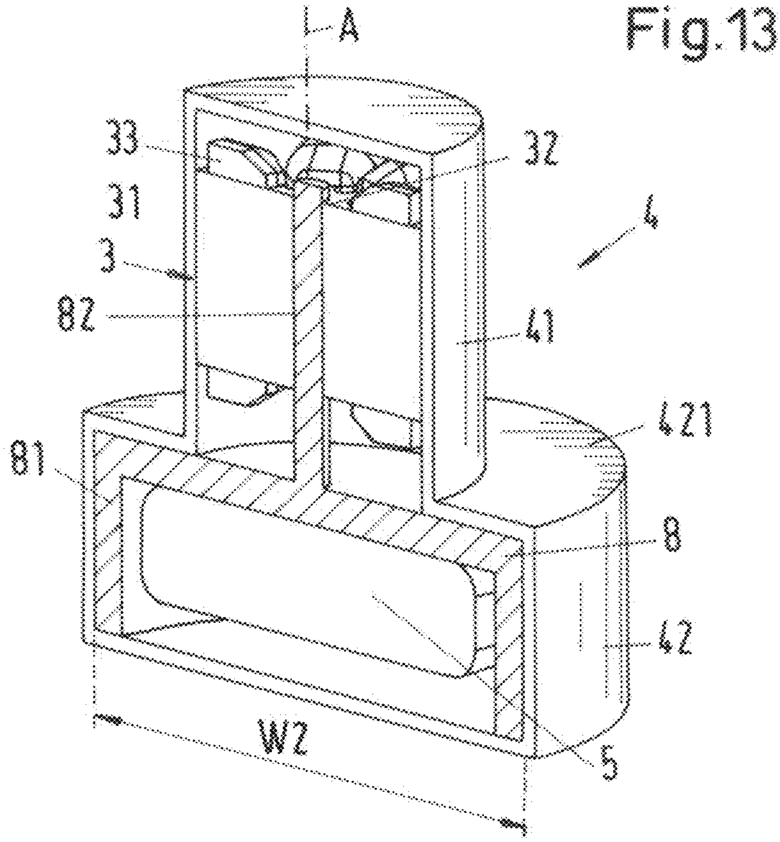
FIG. 13 is as FIG. 12, but for a second variant for the design of the stator housing.

In the second variant for the design of the stator housing 4 illustrated in FIG. 13, the stator 3 is also thermally coupled to the heat conducting element 8. The heat conducting element 8 comprises a cup 81, which has a rotationally symmetrical U-profile. The cup 81 extends completely along and rests against the inner cylindrical wall of the second housing portion 42 of the stator housing 4. Thus, the cup 81 has the outer diameter W2, which corresponds to the inner diameter of the cylindrical second housing portion 42 of the stator housing 4.

In contrast to the first variant illustrated in FIG. 12, in the second variant the heat conduction element 8, more precisely the cup 81, is completely closed at the border between the first housing portion 41 and the second housing portion 42. In addition, the heat element 8 comprises a centrally arranged bar 82, which extends in the axial direction A. The bar 82 extends from the cup 81 in the axial direction A completely through the central pole piece 32 of the stator 3 and ends above the central pole piece 32 according to the representation (FIG. 13). Due to this measure, the stator 3 is also thermally connected to the heat conducting element 8, so that the heat generated in the stator 3 is also distributed over a large area via the stator housing 4 and in particular via the wall of the second housing portion 42. The heat generated in the stator 3 is mainly based on the current flow in the coils 33, which, for example, are made of copper wire (so-called copper losses), on eddy currents, which are induced in the coil cores 31 and the central pole piece 32, which, for example, are made of iron, and on remagnetization losses, so-called hysteresis losses. The eddy current losses and hysteresis losses are together also called iron losses.

Figure 14:
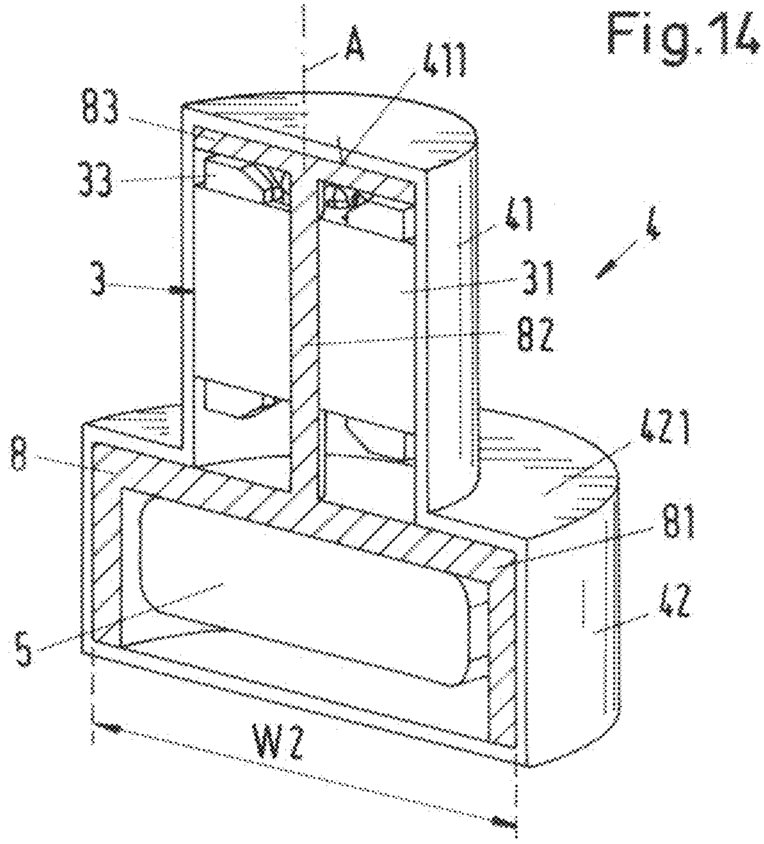
FIG. 14 is as FIG. 12, but for a third variant for the design of the stator housing.

In FIG. 14, a third variant for the design of the stator housing 4 with the heat conducting element 8 is represented. For better understanding, FIG. 15 still shows a perspective view of the heat conducting element 8 from FIG. 14.

In the third variant, as in the second variant, the heat conduction element 8 also comprises the cup 81, which surrounds the checking device 5, and the bar 82 which extends from the cup 81 in the axial direction A through the interior of the central pole piece 32. In addition, a circular disk-shaped plate 83 is provided in the third variant, which is arranged at the end of the bar 82 facing away from the cup 81 and is parallel to the radial plane. The plate 83 has a diameter W1, which corresponds to the inner diameter of the cylindrical first housing portion 41. According to the representation (FIG. 14), the plate 83 is arranged above the coils 33 of the stator 3 and rests against the inner end face 411, which bounds the first housing portion 41 in the axial direction A on the suction side 61. In this third variant, heat is thus additionally distributed over a large area on the inner end face 411 of the stator housing 4 and is introduced into the plastic of the stator housing 4. Thus, the inner end face 411 is also used as an additional surface into which the plate 83, which is of course preferably also made of aluminum, introduces heat, which is then carried away by the incoming fluid.

Figure 15:
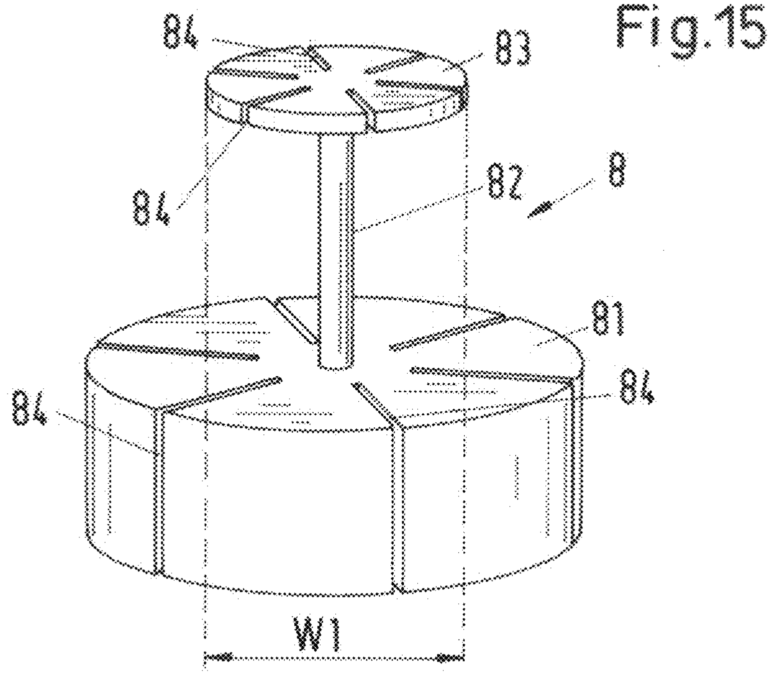
FIG. 15 is a perspective view of the heat conducting element of FIG. 14, a third variant for the design of the stator housing of the embodiment.

In FIG. 15, a further advantageous measure is still shown, which can of course also be realized in the first variant (FIG. 12) or in the second variant (FIG. 13). The heat conduction element 8 in fact preferably includes a plurality of slits 84, each of which extending in the thermal flow direction of the heat, namely in the radial direction outwards. If the heat conduction element—as preferred—is made of a metallic material, i.e. aluminum in particular, eddy currents and the associated eddy current losses in the heat conduction element 8 can be at least very strongly reduced, while the thermal dissipation of the heat through the slits 84 is only negligibly influenced. In the third variant of the heat conduction element 8 represented in FIG. 15, the slits 84 running in the radial direction are disposed in both the plate 83 and the cup 82.

In the following, some variants for the design of the impeller 21 of the rotor 2 are explained on the basis of FIG. 16-FIG. 21. All these representations are schematic and reduced to what is sufficient for understanding. The impeller 21 comprises the annular hub 23, which is arranged around the stator 3 encapsulated in the stator housing 4, and several blades 24, which are firmly connected to the hub 23. The blades 24, which are preferably made of plastic, can either be manufactured in one piece with the hub 23, or the blades 24 are manufactured separately from the hub 23 and are then firmly connected to the hub 23, for example with the aid of an adhesive or by a welding process.

The hub 23 is preferably manufactured in two pieces in such a way that firstly a first part of the hub 23 is manufactured, in which a recess is disposed for the magnetically effective core 22 of the rotor 2. The magnetically effective core 22 is then inserted into this recess. Subsequently, a second part of the hub 23, which is designed as a cover, is firmly connected to the first part of the hub, preferably by a welding process, so that the magnetically effective core 22 is hermetically encapsulated in the hub 23.

As can be clearly seen in particular in FIG. 3, the blades 24 of the impeller 21 are preferably each designed in such a way that they are inclined against the axial direction A. For better understanding, this inclination against the axial direction A is not represented in the schematic FIG. 16 to FIG. 21. In these FIGS. 16 to 21, the space swept by the blades 24 during rotation about the axial direction A is represented in each case in a section along the axis of rotation—i.e. a section along the axial direction A—so that the inclination of the blades 24 against the axial direction A, i.e. against the respective section plane in FIG. 16-FIG. 21, is not represented. These representations correspond in each case to a vertical projection of the blades 24 onto the respective drawing plane.

Furthermore, FIG. 16-FIG. 21 show the impeller 21 in each case in the operating state when the magnetically levitated rotor 2 is centered in the radial plane, i.e. in the magnetic center plane of the stator 3, with respect to the stator 3. In FIG. 16 to FIG. 21 only the stator housing 4 is shown. The arrows without reference signs indicate in each case the direction in which the fluid flow, i.e. in particular the air flow, flows. According to the representation, the suction side 61 is in each case at the top and the pressure side 62 at the bottom. In FIG. 16 to FIG. 21, it is also referred to a geometric center plane RM. The geometric center plane RM is that plane perpendicular to the axial direction A, which extends through the geometric center of the magnetically effective core 22 of the rotor 2. If the rotor 2 is centered and is not tilted with respect to the stator 3, then the geometric center plane RM and the radial plane, i.e. the magnetic center plane of the stator 3, coincide.

Preferably, all blades 24 of the impeller 21 are designed identically.

Figure 16:
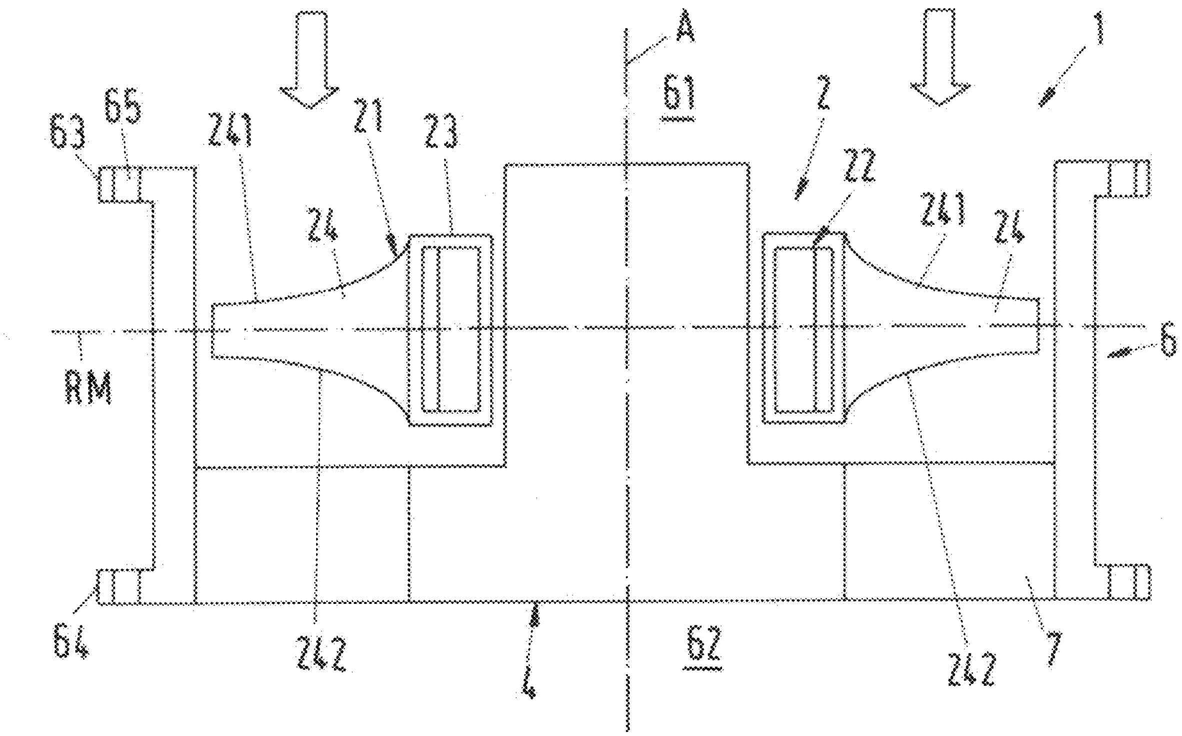
FIG. 16 is a schematic sectional view of the rotor with the blades of the impeller arranged in the housing of the fan in a section along the axial direction.

FIG. 16 shows a schematic sectional view of a first variant of the rotor 2 with the impeller 21, which comprises the hub 23 and the blades 24. Each blade 24 has a leading edge 241, which faces the suction side 61, and a trailing edge 242, which faces the pressure side 62. In this first variant, each blade 24 is designed and arranged symmetrically with respect to the center plane RM. The height of each blade 24 in the axial direction A decreases to the outside from the hub 23 in the radial direction. The leading edge 241 and the trailing edge 242, which are symmetrical with respect to the center plane RM, can be curved in each case as shown in FIG. 16. Of course, it is also possible to design the leading edge 241 and the trailing edge 242 in a straight line, i.e. without curvature.

As already mentioned, the magnetic air gap in the magnetic circuit between the rotor 2 and the stator 3 is quite large compared to known rotary drives designed as bearingless motors due to the complete encapsulation of the magnetic core 22 of the rotor 2 on the one hand and the stator 3 on the other hand. It is therefore a particularly preferred measure that the rotor 2 with the impeller 21 is designed for a fluid-dynamic stabilization of the rotor 2 during operation. In particular, the rotor 2 should preferably be designed in such a way that the fluid flowing through the fan 1, i.e. for example the flowing air, stabilizes the rotor 2 with respect to its position in the axial direction A and against tilts respective to the radial plane. In doing so, it is achieved that the rotor 2 is stabilized by the flowing fluid with respect to those degrees of freedom in which the rotor 2 is passively magnetically levitated or stabilized. The fluid-dynamic stabilization thus supports the passive magnetic bearing or stabilization of the rotor 2. Due to the fluid-dynamic stabilization by the flowing fluid, the passive magnetic axial bearing of the rotor 2 in particular is also attenuated, so that vibrations of the rotor 2 in the axial direction A are suppressed or at least strongly attenuated.

In the following, on the basis of different variants in a non-exhaustive list, measures are explained how the rotor 2 can be designed for fluid-dynamic stabilization. It is understood that some of these measures can also be combined.

Figure 17:
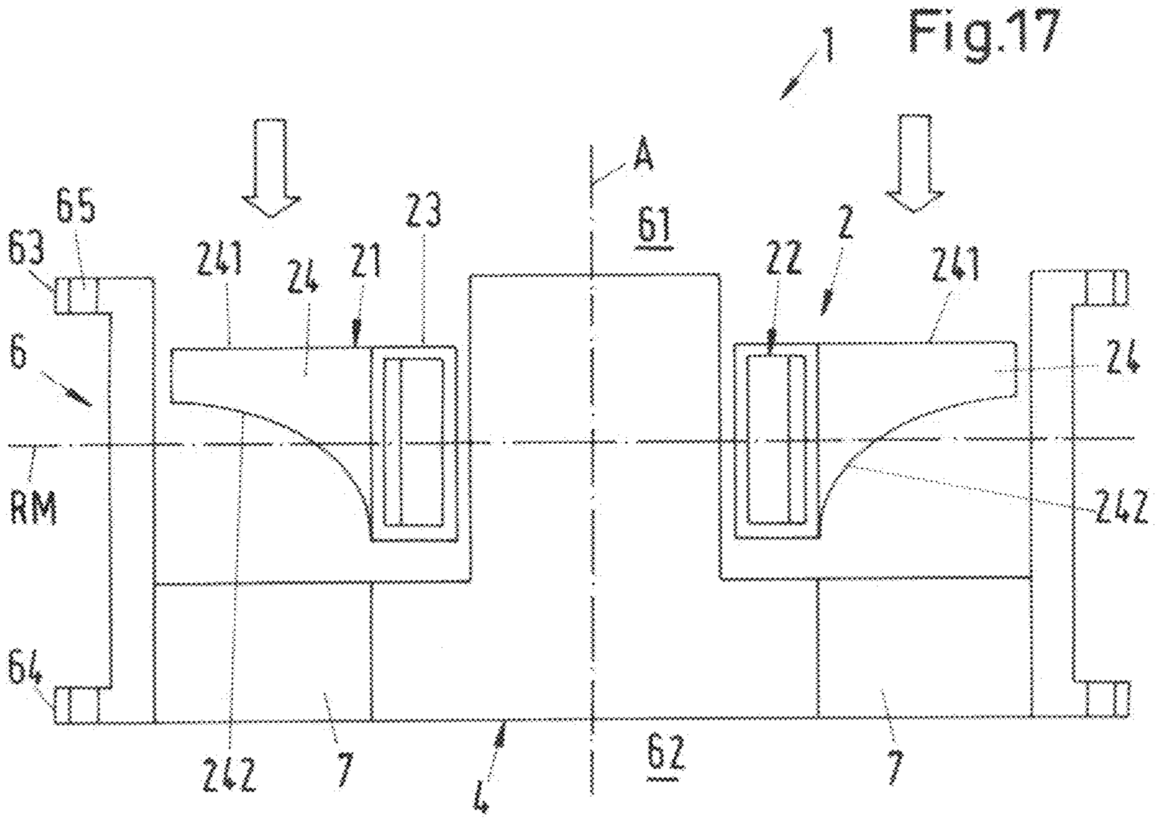
FIGS. 17-21 are in each case as FIG. 16, but for different variants for the design of the rotor with fluid-dynamic stabilization of the rotor.

FIG. 17 shows a variant, in which the blades 24 have an asymmetrical design on the one hand and are displaced in the direction of the suction side 61 on the other hand. Each blade 24 is designed and arranged in such a way that its center of gravity is clearly outside the center plane RM and is between the suction side 61 and the center plane RM. The leading edge 241 extends from the hub 23 in a straight line, i.e. not curved, in the radial direction to the outside, i.e. it extends perpendicular to the axial direction A, wherein the leading edge 241 is aligned with the suction-side end of the hub 23. The trailing edge 242 is curved in the radial direction in a similar way to the variant represented in FIG. 16 but is also displaced in the direction of the suction side 61.

Figure 18:
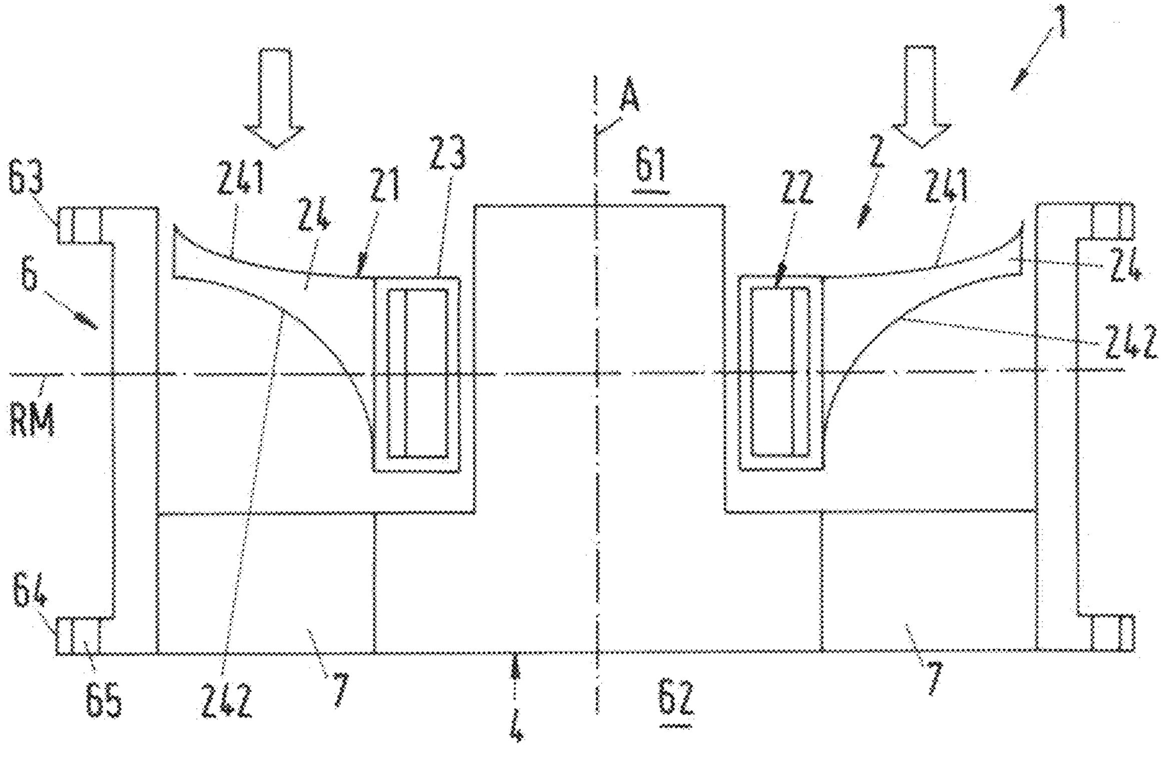

The variant represented in FIG. 18 is designed in a similar way as the one represented in FIG. 17, however, in the variant according to FIG. 18, the blades 24—more precisely their respective center of gravity—are displaced even further in the direction of the suction side 61. In addition, each leading edge 241 is also curved, the curvature being in such a way that the radially inside end of the leading edge 241 is aligned with the suction-side end of the hub 23, and the radially outside end of the leading edge 241 projects beyond the suction-side end of the hub 23 in the direction of the suction side 61.

Figure 19:
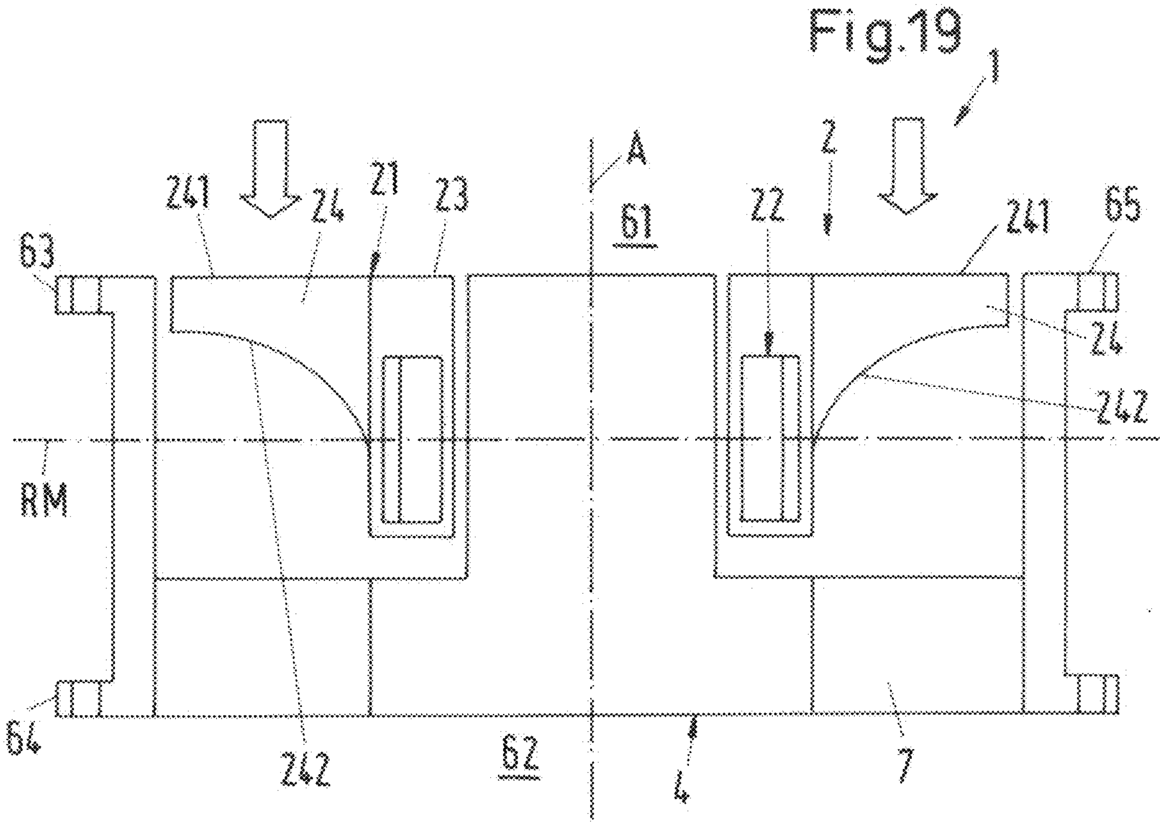

In the variant shown in FIG. 19, the magnetically effective core 22 of the rotor 2 is displaced in the direction of the pressure-side end of the hub 23. The magnetically effective core 22 is thus no longer centered in the hub 23 with respect to the axial direction A but is arranged closer to the pressure-side end of the hub 23 than to the suction-side end of hub 23. Each leading edge 241 extends from the hub 23 in a straight line, i.e. not curved, in the radial direction to the outside, i.e. it extends perpendicular to the axial direction A, wherein each leading edge 241 is aligned with the suction-side end of the hub 23. The trailing edge 242 is curved in each case in the radial direction in a similar way to the variant represented in FIG. 17 but, according to the representation (FIG. 19), the trailing edge 242 opens into the outer surface of the hub 23 above the pressure-side end of the hub 23, i.e. the trailing edge 242 does not extend to the pressure-side end of the hub 23 with respect to the axial direction A. Of course, it is also possible with the variant represented in FIG. 19 to design the trailing edge 242 in a straight line, i.e. not curved.

Figure 20:
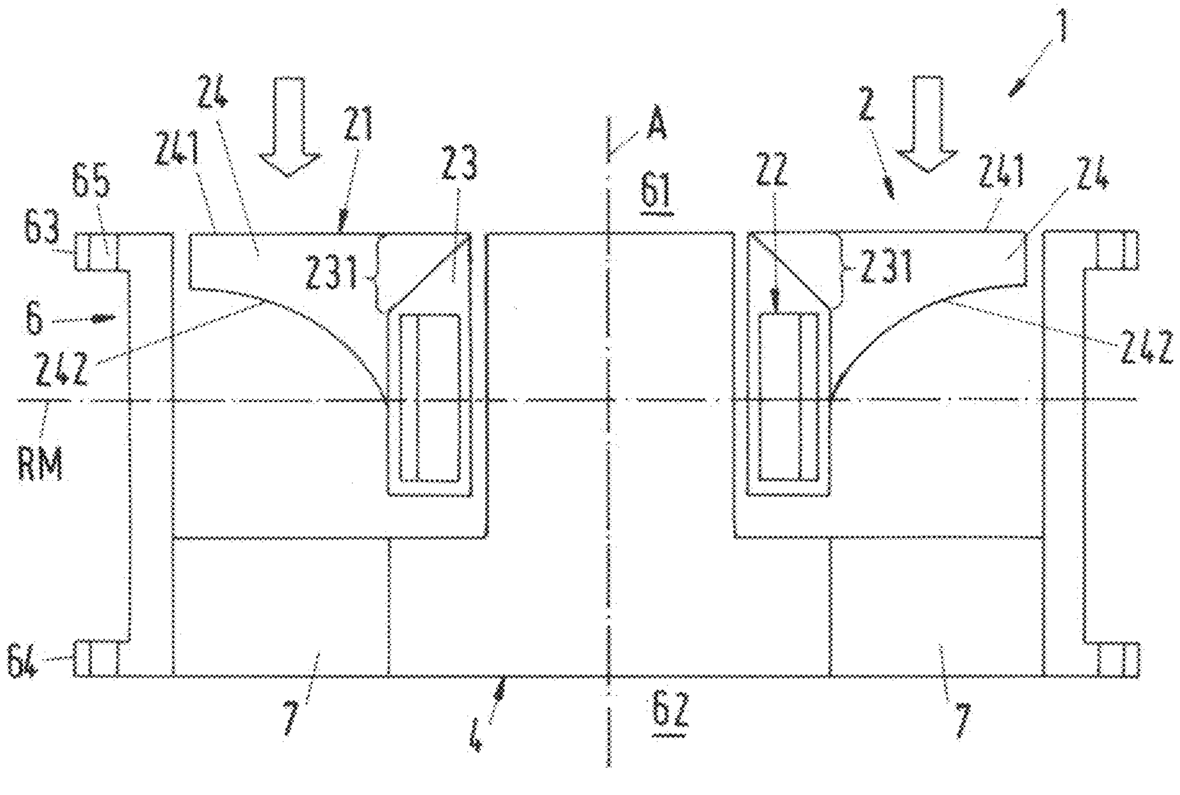

The variant of the impeller 21 represented in FIG. 20 is designed in a similar way as the variant represented in FIG. 19. However, in the variant represented in FIG. 20, the hub 23 of impeller 21 has an inlet area 231 at its suction-side end in which the hub 23 is designed tapering in the direction of the suction-side end. This means that in this inlet area 231, the hub 23 is designed cone-shaped or truncated cone-shaped, wherein the apex of the cone lies at the suction side. According to the representation, the inlet area 231 is arranged above the magnetically effective core 22 with respect to the axial direction A.

Figure 21:
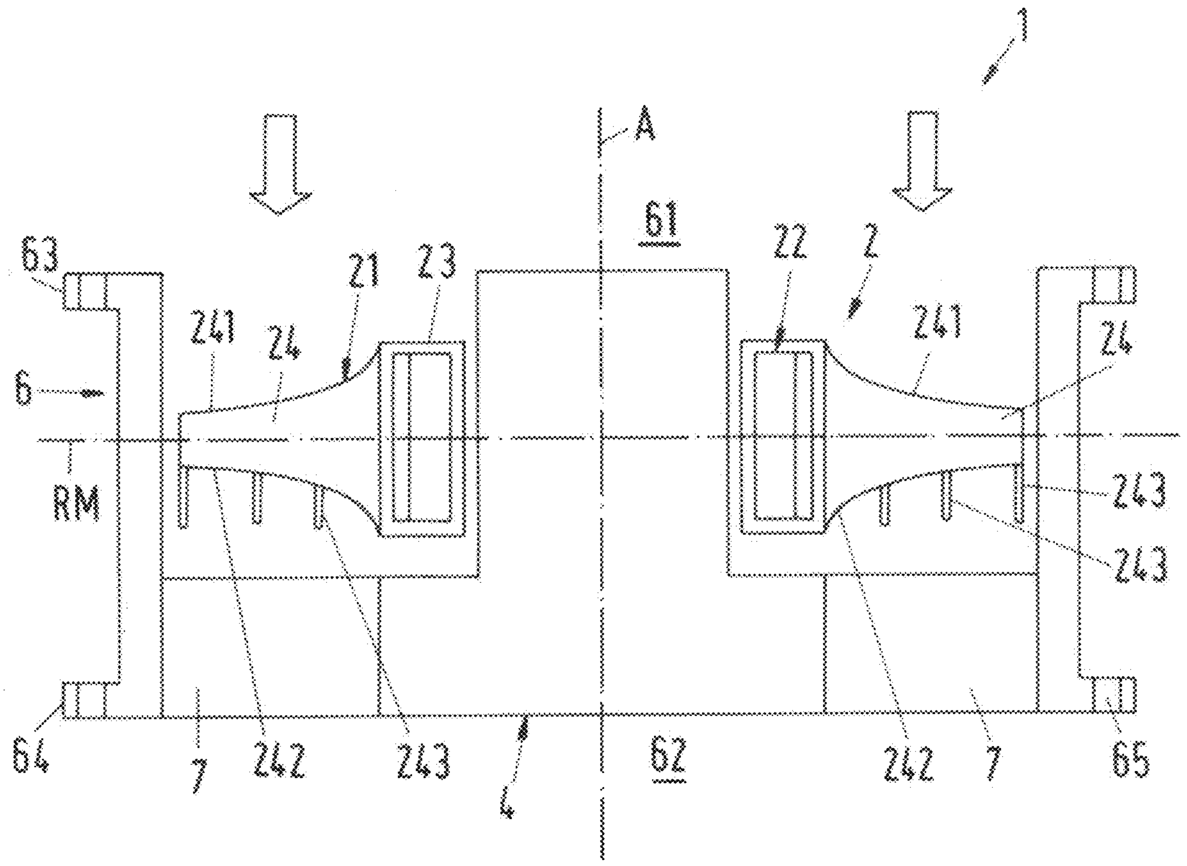

The variant represented in FIG. 21 is designed in a similar way as the variant represented in FIG. 16. However, in the variant shown in FIG. 21, several concentrically arranged stabilizing rings 243 are included, each of which is arranged at the trailing edges 243 of all blades 24 and projects beyond the blades 24 on the pressure side with respect to the axial direction A. Each stabilizing ring 243 is arranged coaxially with the rotor 2 and extends over the trailing edges 242 of all blades 24 in each case. In the variant represented in FIG. 21, three concentric stabilizing rings 243 are included. Of course, it is also possible to include only one stabilizing ring 243.

As already mentioned, the variants or measures described in FIG. 16 to FIG. 21 can also be combined. For example, it is thus possible to include also one or more stabilizing ring(s) 243 in each case in the variants according to FIG. 17 to FIG. 20. A further preferred measure, which can be realized in all variants, see FIG. 16 to FIG. 21, is if each trailing edge opens into the hub 23 at an angle against the axial direction A which is different from 90° and which is in particular less than 90°. This measure is possible both for trailing edges 242 curved in the radial direction (see FIG. 16 to FIG. 21) and for such trailing edges (not shown) that are straight, i.e. not curved.

In addition, or as an alternative to fluid-dynamic stabilization, an active attenuation can also be provided by the coils 33 or the electromagnetic fields generated by them. For this purpose, the rotary field generated by the coils 33 is oriented in such a way that it no longer causes any torque on the rotor 2 but weakens or strengthens the magnetic field generated by the permanent magnets 221. This means that the rotary field generated by the coils is adjusted in such a way that the current pointer points in the same or opposite direction as the magnetic flux pointer, so that there is no longer a 90° phase displacement between these two pointers.

This method can also be used advantageously to decelerate the rotor particularly quickly. The kinetic energy existing in the rotor 2 is destroyed by trying to change the magnetization of the permanent magnets 221 in the rotor 2. This destruction of the kinetic energy of the rotor 2 leads to a rapid deceleration of the rotation of the rotor 2.

A further preferred measure is that a sensor 9 is provided with which a pressure or flow rate of the fluid flow can be determined, wherein the sensor 9 is signal-connected to the checking device 5. Preferably, the checking device 5 is then designed to regulate or control the pressure or flow rate. The sensor 9 can be arranged on the suction side or pressure side of the rotor 2.

Figure 23:
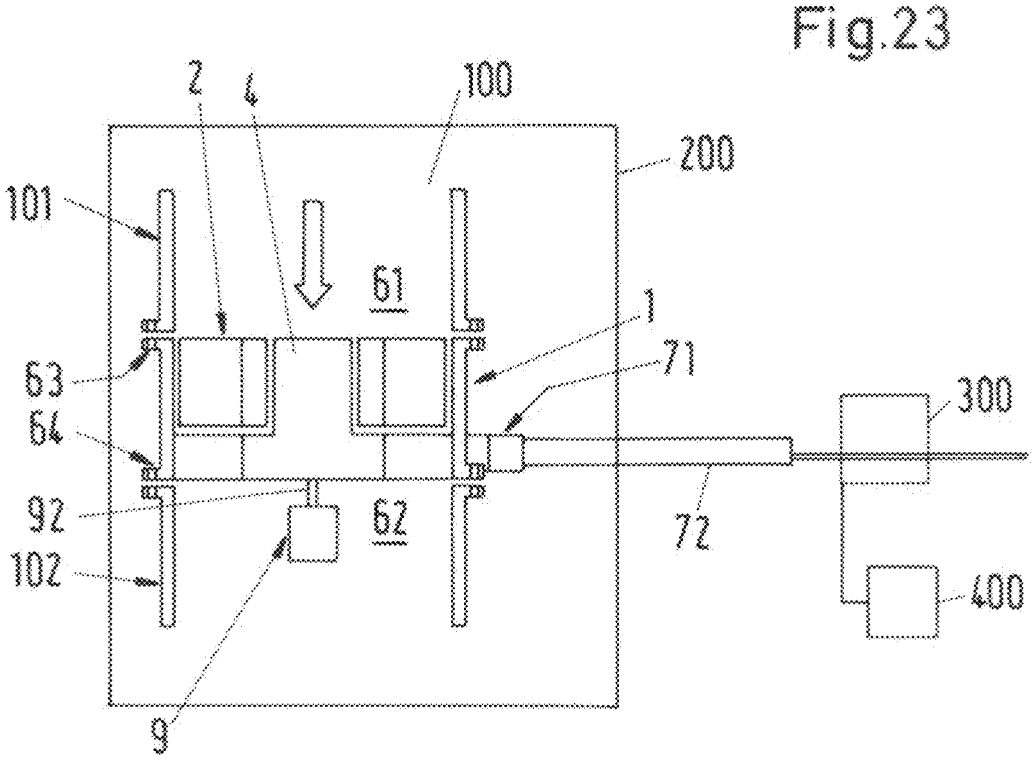
Figure 24:
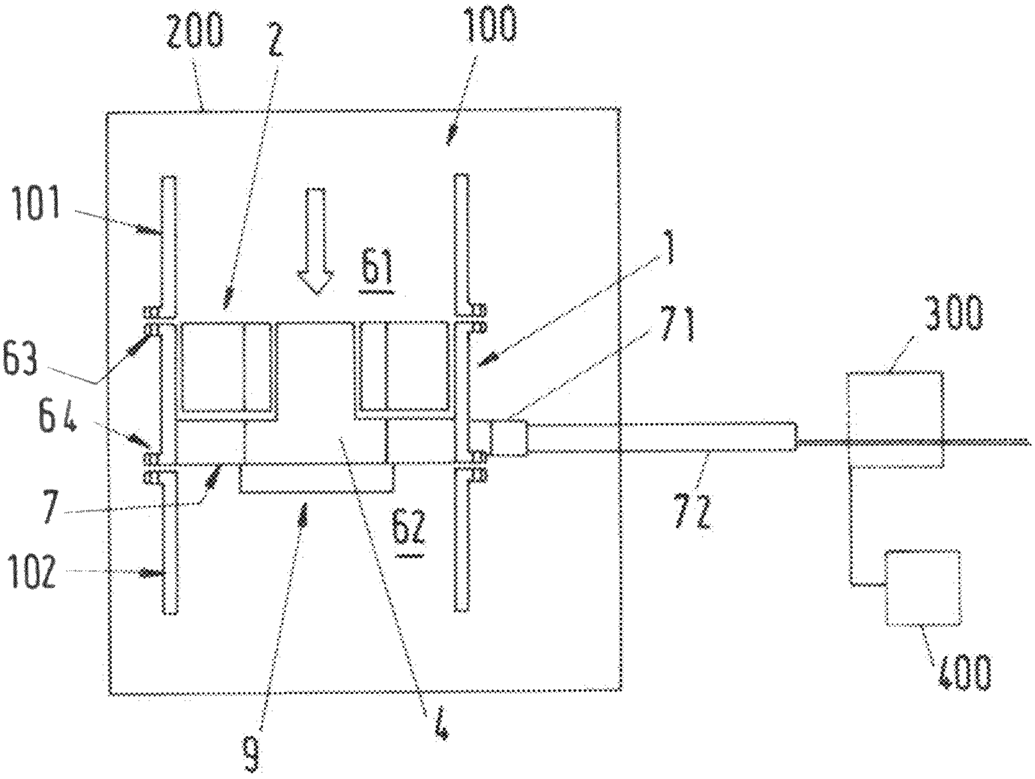

On the basis of the schematic views in FIG. 22 to FIG. 24, various variants are now explained in which the fan 1 is designed and arranged for the regulation or control of a fluid flow, for example an air flow. It is referred to the application with an exemplary nature that the fan 1 is integrated into a pipe 100 and is intended to generate there a regulable or controllable fluid flow. The pipe 100 is arranged in a chamber 200. This can be a chamber 200 that requires chemical resistance, as can be the case in the semiconductor industry.

FIG. 22 shows a variant in which the fan 1 is integrated into the pipe 100, which passes through the chamber 200. The fan is arranged between a first segment 101 and a second segment 102 of the pipe 100. For this purpose, the suction-side flange 63 of the fan 1 is firmly connected to a flange of the first segment 101, and the pressure-side flange 64 is firmly connected to a flange of the second segment 102. The fluid flow generated by the fan 1 is indicated by the arrow without reference sign. The sensor 9 is designed as a pressure sensor or flow sensor and is disposed on the suction side, i.e. upstream of the fan 1. The sensor 9 can, for example, be attached to the pipe 100 or also to the fan 1. The sensor 9 is signal-connected to an external logic unit 300, for example via a signal line 91 or also wirelessly. For example, the logic unit 300 is designed as a programmable logic controller (PLC). On the logic unit 300, the analog signal of the sensor 9, for example, is fed via the cable 72 to the checking device 5. The checking device 5 comprises the necessary regulation devices to regulate or control the fluid flow in the pipe 100 by signal of the sensor 9. By these regulation devices, the fluid flow can be regulated to a predeterminable desired value.

The fan is further connected to a communication interface 400, via which a user can enter or read out data. Of course, such embodiments are also possible in which the sensor 9 is arranged on the pressure side, i.e. downstream of the fan, or in which a sensor 9 is disposed on both the suction side and the pressure side of the fan 1.

For the variants represented in FIG. 23 and FIG. 24, only the differences to the variant shown in FIG. 22 are explained. Otherwise, the explanations given in FIG. 22 also apply in the same or analogous manner to the variants represented in FIG. 23 and FIG. 24.

In the variant represented in FIG. 23, the sensor 9 is directly connected to the checking device 5 in the stator housing 4 of the fan 1, for example via a sensor cable 92. The sensor 9 can either be attached directly to the fan 1 or to the pipe 100. FIG. 23 shows an embodiment in which the sensor 9 is arranged on the pressure side of the fan 1. Of course, embodiments are also possible here in which the sensor 9 is arranged on the suction side of the fan 1, or in which a sensor 9 is disposed on both the suction side and the pressure side of the fan 1. Even with this direct signal connection between the sensor 9 and the checking device 5, the necessary evaluation devices for the sensor signals as well as the control or regulation devices for adjusting the fluid flow or regulating the fluid flow are directly integrated in the checking device 5.

In the variant represented in FIG. 24, the sensor 9 is directly integrated in the fan 1. The sensor 9 can, for example, be attached to the housing 6 of the fan 1 or also—as shown in FIG. 24—to the stator housing 4. The sensor 9 can be attached to the pressure side (see FIG. 24) or also to the suction side of the stator housing 4. Of course, embodiments are also possible here in which a sensor 9 is disposed on both the suction side and the pressure side. The sensor 9 is signal-connected to the checking device 5 arranged in the stator housing 4. In this variant, too, the necessary evaluation devices for the sensor signals as well as the control or regulation devices for adjusting the fluid flow or regulating the fluid flow are directly integrated in the checking device 5. In particular in this variant, the fan 1 includes the completely integrated sensor 9, in particular a flow or pressure sensor 9, so that the fan 1 can regulate the air flow generated by it to a predeterminable desired value for the pressure or flow rate without any additional components.

What is claimed:

1. A fan for generating a compressible fluid flow, the fan comprising:

a substantially tubular housing having a suction opening configured to suck the compressible fluid therethrough and a pressure opening configured to eject the compressible fluid;

a stator, the stator being free of permanent magnets; and a rotor, the stator together with the rotor forming an electromagnetic rotary drive for rotating the rotor about an axial direction, the rotor being an external rotor, the rotor comprising a magnetic core configured in an annular manner, and an impeller comprising a hub on which a plurality of blades configured to generate the fluid flow is arranged, the stator being a bearing and drive stator configured to magnetically drive the rotor without contact and magnetically levitate the rotor without contact with respect to the stator, and the rotor being capable of being actively magnetically levitated in a radial plane perpendicular to the axial direction, the hub of the impeller completely enclosing the magnetic core of the rotor, and the stator being hermetically encapsulated in a stator housing that is formed of a low-permeable material and that is configured to be completely immersed in the compressible fluid.

2. The fan according to claim 1, the impeller consisting of a first plastic and the stator housing consisting of a second plastic.

3. The fan according to claim 1, the rotor and the stator housing being arranged in the housing, and the stator housing fixed in the housing by a plurality of struts.

4. The fan according to claim 1, wherein the stator housing has a first housing portion and a second housing portion, the first housing portion being arranged within the rotor and being surrounded by the magnetic core of the rotor, and the second housing portion having an outer diameter which is at least as large as an outer diameter of the magnetic core of the rotor.

5. The fan according to claim 4, further comprising a checking device configured to control or regulate the fan, the checking device being arranged in the second housing portion of the stator housing.

6. The fan according to claim 5, further comprising a sensor configured to determine a pressure or a flow rate of the fluid flow, the sensor being signal-connected to the checking device, and the checking device being configured to control or regulate the pressure or the flow rate.

7. The fan according to claim 4, further comprising a heat conductor configured to dissipate heat in the stator housing, and the heat conductor being configured so as to surround at least the checking device.

8. The fan according to claim 1, the stator further comprising a plurality of coil cores each of which extends in the radial direction, and carries a winding configured to generate an electromagnetic rotary field.

9. The fan according to claim 1, wherein the magnetic core of the rotor comprises an annular reflux and a plurality of permanent magnets, the reflux being contiguous and formed of a soft magnetic material, and each permanent magnet being fitted into a radially inner side of the reflux.

10. The fan according to claim 1, wherein the rotor is configured for fluid-dynamic stabilization of the rotor against tilting.

11. The fan according to claim 1, wherein the hub of the impeller has a suction-side end and a pressure-side end, and the magnetic core of the rotor is closer to the pressure-side end than to the suction-side end of the hub with respect to the axial direction.

12. The fan according to claim 11, wherein the hub of the impeller comprises an inlet area at the suction-side end, and the hub tapers in a direction of the suction-side end.

13. The fan according to claim 1, wherein each blade of the plurality of blades has a leading edge, each leading edge extending perpendicularly to the axial direction.

14. The fan according to claim 1, wherein each blade of the plurality of blades has a trailing edge, each trailing edge opening into the hub at an angle to the axial direction different from 90°.

15. The fan according to claim 1, wherein each blade of the plurality of blades has a trailing edge, and at least one stabilizing ring is disposed at each of the trailing edges, the at least one stabilizing ring being arranged coaxially with the rotor.

* * * * *